United States Patent
Peng et al.

(10) Patent No.: US 11,950,314 B2
(45) Date of Patent: *Apr. 2, 2024

(54) CONFIGURATION METHOD AND APPARATUS, AND SYSTEM

(71) Applicant: HUAWEI TECHNOLOGIES CO., LTD., Guangdong (CN)

(72) Inventors: Wenjie Peng, Shanghai (CN); Mingzeng Dai, Shenzhen (CN); Yi Guo, Shenzhen (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,636

(22) Filed: Aug. 1, 2022

(65) Prior Publication Data

US 2022/0369415 A1 Nov. 17, 2022

Related U.S. Application Data

(63) Continuation of application No. 16/579,168, filed on Sep. 23, 2019, now Pat. No. 11,425,779, which is a (Continued)

(30) Foreign Application Priority Data

Mar. 23, 2017 (CN) .......................... 201710179753.7

(51) Int. Cl.
*H04W 76/27* (2018.01)
*H04W 12/041* (2021.01)
(Continued)

(52) U.S. Cl.
CPC ......... *H04W 76/27* (2018.02); *H04W 12/041* (2021.01); *H04W 76/11* (2018.02); *H04W 80/02* (2013.01)

(58) Field of Classification Search
None
See application file for complete search history.

(56) References Cited

U.S. PATENT DOCUMENTS

| 2013/0343280 A1 | 12/2013 | Lee et al. |
| 2015/0043492 A1 | 2/2015 | Baek et al. |

(Continued)

FOREIGN PATENT DOCUMENTS

| CN | 103139911 | 6/2013 |
| CN | 104618927 A | 5/2015 |

(Continued)

OTHER PUBLICATIONS

3GPP TS 36.331 V14.1.0 (Dec. 2016), "3rd Generation Partnership Project, Technical Specification Group Radio Access Network, Evolved Universal Terrestrial Radio Access (E-UTRA), Radio Resource Control (RRC), Protocol specification (Release 14)," Dec. 2016, 653 pages.

(Continued)

*Primary Examiner* — Saumit Shah
(74) *Attorney, Agent, or Firm* — Fish & Richardson P.C.

(57) ABSTRACT

Example configuration methods and apparatus are described. An example communications system includes a master node and a secondary node that jointly provide a service for a terminal. One example method includes generating configuration information for a signaling radio bearer (SRB) by the secondary node, where the SRB is used to transmit a radio resource control (RRC) message between the secondary node and the terminal. The secondary node sends the configuration information for the SRB to the master node, so that the configuration information for the SRB is sent to the terminal through the master node. The secondary node receives a result of configuring the SRB by the terminal by using the configuration information for the SRB. In this way, the SRB can be established on the (Continued)

secondary node, and used for RRC message transmission between the secondary node and the terminal.

20 Claims, 9 Drawing Sheets

Related U.S. Application Data continuation of application No. PCT/CN2018/079627, filed on Mar. 20, 2018.

(51) Int. Cl.
*H04W 76/11* (2018.01)
*H04W 80/02* (2009.01)

(56) References Cited

U.S. PATENT DOCUMENTS

| | | |
|---|---|---|
| 2015/0119048 A1 | 4/2015 | Yang et al. |
| 2015/0131578 A1 | 5/2015 | Baek et al. |
| 2015/0215826 A1 | 7/2015 | Yamada |
| 2015/0319801 A1 | 11/2015 | Lee et al. |
| 2016/0044743 A1 | 2/2016 | Xu et al. |
| 2016/0183151 A1 | 6/2016 | Wu |
| 2016/0192249 A1 | 6/2016 | Wu |
| 2016/0212753 A1 | 7/2016 | Wu |
| 2016/0219603 A1* | 7/2016 | Fujishiro ............ H04W 72/542 |
| 2016/0249210 A1 | 8/2016 | Chang et al. |
| 2016/0262194 A1 | 9/2016 | Zhang et al. |
| 2016/0269241 A1 | 9/2016 | Zhang et al. |
| 2016/0338134 A1 | 11/2016 | Nagasaka et al. |
| 2017/0019945 A1 | 1/2017 | Chiba et al. |
| 2017/0150414 A1 | 5/2017 | Quan et al. |
| 2018/0160411 A1 | 6/2018 | Zhang et al. |
| 2019/0320476 A1 | 10/2019 | Wang et al. |

FOREIGN PATENT DOCUMENTS

| | | |
|---|---|---|
| CN | 105722137 A | 6/2016 |
| CN | 106304403 | 1/2017 |
| CN | 106465435 | 2/2017 |
| EP | 3041310 | 7/2016 |
| EP | 3065444 | 9/2016 |
| JP | 2015070341 | 4/2015 |
| JP | 2016076930 | 5/2016 |
| KR | 20150055535 A | 5/2015 |
| RU | 2015109937 | 10/2016 |
| WO | WO2014101140 | 7/2014 |
| WO | WO2015015300 | 2/2015 |
| WO | WO2015062476 | 5/2015 |
| WO | WO2015115034 | 8/2015 |
| WO | WO2015140038 | 9/2015 |
| WO | WO2017010693 | 1/2017 |
| WO | WO2018029596 | 2/2018 |

OTHER PUBLICATIONS

3GPP TS 36.423 V14.1.0 (Jan. 2017), "3rd Generation Partnership Project, Technical Specification Group Radio Access Network, Evolved Universal Terrestrial Radio Access Network (E-UTRAN), X2 application protocol (X2AP)(Release 14)," Jan. 2017, 240 pages.
ASUSTeK, "Consideration on User Plane architecture in Control Plane aspect," 3GPP TSG-RAN WG2 Meeting #83bis, R2-133244, Ljubljana, Slovenia, Oct. 7-11, 2013, 2 pages.
Ericsson, "Security for dual connectivity," 3GPP TSG-RAN WG3 Meeting #83bis, R3-140820, San Jose del Cabo, Mexico, 6 pages.
Etri, "Discussion on RRC signalling via SeNB",3GPP TSG-RAN2 Meeting #84 R2-134005, San Francisco, USA, Oct. 11-15, 2013, 3 pages.
Extended European Search Report issued in European Application No. 18772014.9 dated Feb. 18, 2020, 9 pages.
Huawei, HiSilicon, "Text proposal to capture SCG failure caused by T307 expiration," 3GPP TSG RAN WG2 Meeting #88, R2-145190, San Francisco, USA, Nov. 17-21, 2014, 7 pages.
Nsn et al., "RRC message transmission via SeNB",3GPP TSG-RAN WG2 Meeting #84 R2-133874, San Francisco, USA, Nov. 11-15, 2013, 3 pages.
NTT Docomo et al., "Leftover Issues on RRC Message Transport for LTE-NR Dual Connectivity," 3GPP TSG-RAN WG2 #97, R2-1700829, Feb. 13-17, 2017, Athens, Greece, 3 pages.
Office Action issued in Indian Application No. 201937039202 dated Mar. 17, 2021, 6 pages.
Office Action issued in Japanese Application No. 2019-551439 dated Nov. 4, 2020, 16 pages (with English translation).
Office Action issued in Korean Application No. 2019-7030267 dated Jul. 1, 2021, 4 pages (with English translation).
Office Action issued in Korean Application No. 2019-7030267 dated Nov. 10, 2020, 18 pages (with English translation).
Office Action issued in Russian Application No. 2019133391/07(065964) dated Aug. 30, 2021, 17 pages (with English translation).
PCT International Search Report and Written Opinion in International Application No. PCT/CN2018/079,627, dated Jun. 8, 2018, 24 pages.
Samsung, "Discussion on dual Rrc," 3GPP TSG-RAN WG2 Meeting #82, R2-131830, Fukuoka, Japan, May 20-24, 2013, 2 pages.
Zte et al., "Consideration on the Transmission of NR RRC Message in LTE/NR Tight Interworking," 3GPP TSG RAN WG2 Meeting #95bis, R2-166340, Kaohsiung, Oct. 10-14, 2016, 4 pages.
Ericsson, "Direct SRB between secondary node and UE," 3GPP TSG-RAN WG2 NR Ad Hoc, R2-1700484, Spokane, USA, Jan. 17-19, 2017, 3 pages.
Office Action in Chinese Appln. No. 201710179753.7, dated Mar. 31, 2023, 13 pages.

* cited by examiner

| HFN | PDCP SN |

CONFIGURATION METHOD AND APPARATUS, AND SYSTEM

CROSS-REFERENCE TO RELATED APPLICATIONS

This application is a continuation of U.S. patent application Ser. No. 16/579,168, filed on Sep. 23, 2019, which is a continuation of International Application No. PCT/CN2018/079627, filed on Mar. 20, 2018, which claims priority to Chinese Patent Application No. 201710179753.7, filed on Mar. 23, 2017. All of the afore-mentioned patent applications are hereby incorporated by reference in their entireties.

TECHNICAL FIELD

This application relates to the field of communications technologies, and in particular, to a configuration method and apparatus, and a system.

BACKGROUND

In a wireless communications system, considering limited bandwidth resources and coverage of a single cell or base station (or referred to as a node), a service may be provided for a terminal by using radio resources of more than one cell or base station, to better meet capacity and coverage requirements.

When a service is provided for a terminal by using radio resources of more than one base station, it is possible that a latency of transmission between base stations cannot meet a scheduling requirement. Therefore, a dual connectivity (DC) technology is proposed, and has relatively good application in a scenario of non-ideal backhaul between a master base station and a secondary base station.

In a current dual connectivity system, a signaling radio bearer (SRB) is provided by a master base station, a secondary base station does not provide an SRB, and all radio resource control (RRC) messages of a terminal are processed by the master base station. This is not beneficial to improvement in RRC message processing efficiency.

SUMMARY

Embodiments of this application provide a configuration method and apparatus, and a system, in the expectation of establishing an SRB on a secondary node, to implement direct RRC message transmission between the secondary node and a terminal. This is beneficial to improvement in RRC message processing efficiency.

According to an aspect, a configuration method is provided, applied to a communications system. The communications system includes a master node and a secondary node that jointly provide a service for a terminal. The method includes: generating, by the secondary node, configuration information for a signaling radio bearer (SRB), and sending the configuration information for the SRB to the master node, so that the configuration information for the SRB is sent to the terminal through the master node; and receiving, by the secondary node, a result of configuring the SRB by the terminal by using the configuration information for the SRB, where the SRB is used to transmit a radio resource control (RRC) message between the secondary node and the terminal.

According to another aspect, a configuration method is provided, applied to a communications system. The communications system includes a master node and a secondary node that jointly provide a service for a terminal. The method includes: receiving, by the terminal, configuration information for an SRB of the secondary node from the master node, configuring the SRB by using the configuration information for the SRB, and sending a result of configuring the SRB, where the SRB is used to transmit an RRC message between the secondary node and the terminal.

According to still another aspect, a configuration method is provided, applied to a communications system. The communications system includes a master node and a secondary node that jointly provide a service for a terminal. The method includes: receiving, by the master node, configuration information for an SRB from the secondary node, and sending the configuration information for the SRB to the terminal; and receiving, by the master node, a result of configuring the SRB by the terminal by using the configuration information for the SRB, and sending the configuration result to the secondary node, where the SRB is used to transmit an RRC message between the secondary node and the terminal.

In the foregoing aspects, the configuration information for the SRB may also be referred to as SRB configuration information or direct secondary node RRC (direct S-RRC) configuration information. The configuration information for the SRB (the SRB configuration information or the direct S-RRC configuration information) is used to configure the SRB for directly transmitting the RRC message between the secondary node and the terminal. That is, the configuration information for the SRB (the SRB configuration information or the direct S-RRC configuration information) is used by the terminal to configure the SRB based on the configuration information, so that the RRC message is directly transmitted between the terminal and the secondary node. In addition, the configuration result may also be referred to as a direct S-RRC configuration result or a secondary node RRC configuration result.

It can be learned that in the foregoing aspects, the configuration information for the SRB that is used to transmit the RRC message between the secondary node and the terminal may be sent to the terminal through the master node, and after the terminal configures the SRB of the secondary node, the terminal sends the configuration result to the secondary node directly or through the master node. In this way, the RRC message can be directly transmitted between the secondary node and the terminal, and this is beneficial to improvement in RRC message processing efficiency.

In an implementation, the terminal directly sends the configuration result to the secondary node, that is, the terminal sends the configuration result to the secondary node by using the configured SRB; or the terminal sends the configuration result to the master node, so that the configuration result is sent to the secondary node through the master node.

In an implementation, the master node sends first indication information to the secondary node, where the first indication information is used to instruct the secondary node to establish the SRB or is used to instruct the secondary node to generate the configuration information for the SRB. The secondary node receives the first indication information, and generates the configuration information for the SRB based on the first indication information. In this way, the secondary node can establish the SRB based on an instruction of the master node, and this helps the master node to control establishment of the SRB of the secondary node based on a requirement, making it more flexible to control establishment of the SRB of the secondary node.

Optionally, the first indication information may be carried in an addition request message sent by the master node to the secondary node, where the addition request message is used to request to add a secondary node. Alternatively, the first indication information may be carried in a modification request message sent by the master node to the secondary node, where the modification request message is used to request to modify a configuration of a secondary node.

In an implementation, the master node sends an addition request message to the secondary node, where the addition request message is used to request to add a secondary node. When the secondary node receives the addition request message from the master node, the secondary node generates the configuration information for the SRB. In this way, information elements transmitted between the master node and the secondary node can be reduced. When the secondary node is added, the SRB is established on the secondary node by default.

In an implementation, the configuration information for the SRB may be an RRC protocol data unit (PDU), or may be a part of an RRC PDU.

In an implementation, the configuration information for the SRB may be sent to the master node after the secondary node performs security processing. In this case, before the secondary node sends the configuration information for the SRB to the master node, the secondary node performs security processing on the configuration information for the SRB, where the security processing includes integrity protection and/or encryption. Correspondingly, after the terminal receives the configuration information for the SRB, the terminal performs security processing on the configuration information for the SRB, and then configures the SRB of the secondary node by using the configuration information for the SRB, where the security processing includes integrity check and/or decryption.

In an implementation, the configuration information for the SRB includes at least one of the following information: an SRB identifier, a radio link control (RLC) layer configuration of the SRB, a logical channel configuration, and an SRB security parameter. The SRB security parameter includes, for example, information about a security algorithm and/or a parameter used to derive a security key. The security algorithm includes, for example, an encryption and/or integrity protection algorithm. The information about the security algorithm may be information used to indicate the security algorithm, for example, may be an algorithm indication or an algorithm identifier, or may be the security algorithm.

In an implementation, the secondary node may add the configuration information for the SRB to an acknowledgment message sent to the master node. The acknowledgment message is a response message (that is, an addition request acknowledge message) for the addition request message used to request to add a secondary node, or a response message (that is, a modification request acknowledge message) for the modification request message used to request to modify a configuration of a secondary node. That is, the foregoing method further includes: receiving, by the secondary node, an addition request message or a modification request message from the master node; and the sending, by the secondary node, the configuration information for the SRB to the master node includes: sending, by the secondary node, an addition request acknowledge message or a modification request acknowledge message to the master node, where the addition request acknowledge message or the modification request acknowledge message includes the configuration information for the SRB.

It can be learned that the configuration information for the SRB may be sent by the secondary node to the master node in a secondary node addition process (an initial configuration process of dual connectivity) or a secondary node modification process, so that signaling can be saved, and communication efficiency can be improved. When the configuration information for the SRB is sent by the secondary node to the master node in the secondary node modification process, the secondary node modification process may be triggered by the master node, or may be triggered by the secondary node. When the secondary node modification process is triggered by the secondary node, the foregoing method further includes: sending, by the secondary node, a modification required message to the master node, where the modification required message is used to request the master node to allow the RRC message to be transmitted or the SRB to be established between the secondary node and the terminal.

In an implementation, the master node may send the configuration information for the SRB of the secondary node to the terminal by using an RRC connection reconfiguration message of the master node. Correspondingly, the terminal may send the result of configuring the SRB to the master node by using an RRC connection reconfiguration complete message. That is, the sending, by the master node, the configuration information for the SRB of the secondary node to the terminal includes: sending, by the master node, an RRC connection reconfiguration message to the terminal, where the RRC connection reconfiguration message carries the configuration information for the SRB of the secondary node, and the receiving, by the master node, a result of configuring the SRB by the terminal includes: receiving, by the master node, an RRC connection reconfiguration complete message from the terminal, where the RRC connection reconfiguration complete message carries the configuration result. Correspondingly, the receiving, by the terminal, configuration information for an SRB of the secondary node from the master node includes: receiving, by the terminal, the RRC connection reconfiguration message from the master node, where the RRC connection reconfiguration message carries the configuration information for the SRB of the secondary node, and the sending, by the terminal, a configuration result to the master node includes: sending, by the terminal, the RRC connection reconfiguration complete message to the master node, where the RRC connection reconfiguration complete message carries the configuration result.

In an implementation, when the terminal sends the configuration result to the secondary node through the master node, the terminal sends second indication information to the master node, to indicate a result of configuring the SRB of the secondary node by the terminal. In this way, even when the master node cannot parse the configuration result, the master node can learn of the result of configuring the SRB of the secondary node by the terminal.

In an implementation, the master node may send the configuration information for the SRB of the secondary node to the terminal by using an RRC connection reconfiguration message of the master node. An RRC connection reconfiguration complete message sent by the terminal is a configuration result. In this case, when the master node receives the RRC connection reconfiguration complete message, it is considered that the configuration succeeds. The RRC connection reconfiguration complete message may be an RRC connection reconfiguration complete message sent to the master node, or may be an RRC connection reconfiguration complete message sent to the secondary node.

In an implementation, when the terminal sends the configuration result to the secondary node through the master node, the master node sends the configuration result by using a secondary node reconfiguration complete message. Optionally, the master node sends a secondary node reconfiguration complete message to the secondary node, where the secondary node reconfiguration complete message carries the configuration result. Optionally, the master node sends a secondary node reconfiguration complete message to the secondary node, where the secondary node reconfiguration complete message is the configuration result. In this case, when the secondary node receives the secondary node reconfiguration complete message, it is considered that the configuration succeeds.

In an implementation, the master node may parse out the configuration result, and when the configuration result is successful, send data of the terminal to the secondary node or request a core network to send data of the terminal to the secondary node. Alternatively, the master node may determine, based on the second indication information, the result of configuring the SRB of the secondary node by the terminal, and when the configuration result is successful, send data of the terminal to the secondary node or request a core network to send data of the terminal to the secondary node.

In an implementation, the master node sends security information used for the SRB of the secondary node to the secondary node, where the security information used for the SRB of the secondary node is also referred to as security information for direct S-RRC. The security information includes at least one of the following information: a security key and information about a security algorithm. The security algorithm includes an encryption algorithm and/or an integrity protection algorithm. The information about the security algorithm may be information used to indicate the security algorithm, for example, may be an algorithm indication or an algorithm identifier, or may be the security algorithm. The secondary node receives the security information, and performs security processing for the SRB based on the security information. The master node may send the security information to the secondary node before the secondary node generates the configuration information for the SRB, that is, before the master node receives the configuration information for the SRB of the secondary node. After the secondary node generates the configuration information for the SRB, the secondary node may perform security processing on the configuration information for the SRB by using the security information. The security information may be carried in the addition request message or the modification request message.

In an implementation, the master node sends a key group (also referred to as a key list) to the secondary node, where the key group includes a plurality of keys, so that the secondary node selects a key from the key group when updating a key. The secondary node receives the key group from the master node, and selects a key from the key group when updating the key. In this way, the secondary node can update the key by itself, thereby further improving configuration efficiency on the secondary node.

Optionally, the master node may send the key group based on a requirement of the secondary node. To be specific, the secondary node sends, to the master node, third indication information used to instruct the master node to send the key group.

Optionally, the master node may send a group of count (COUNT) values, that is, a count value group, used to derive the keys in the key group to the secondary node. The secondary node receives the count value group, and sends a count value used to derive the selected key to the terminal when updating a key, so that the terminal also completes synchronous key update.

Optionally, the master node may send a group of count values, that is, a count value group, used to derive the keys in the key group to the terminal. When the secondary node updates a key, the secondary node sequentially selects a key from the key group, and instructs the terminal to update the key, that is, sends a notification message to the terminal to instruct the terminal to update the key. When the terminal receives the notification message, the terminal sequentially selects a count value from the count value group, to perform synchronous key update.

Optionally, the master node sends, to the secondary node, association information between a key in the key group and a count value used to derive the key in the key group. When the secondary node updates a key, the secondary node sends, to the terminal, association information between a selected key and a count value used to derive the key. The terminal receives the association information, selects the count value based on the association information, and performs synchronous key update based on the count value.

In an implementation, after the SRB of the secondary node is configured, the secondary node may directly send an RRC connection reconfiguration message to the terminal for configuration. The terminal receives the RRC connection reconfiguration message, and when reconfiguration corresponding to the RRC connection reconfiguration message fails, restores configuration before the RRC connection reconfiguration message is received. Optionally, the terminal may further send a notification message to the secondary node (directly or through the master node), to notify the secondary node that the RRC connection reconfiguration fails.

In an implementation, the configuration information for the SRB of the secondary node further includes uplink RRC configuration information, where the uplink RRC configuration information is used to configure a manner in which the terminal sends an uplink RRC message for the secondary node.

According to still another aspect, this application provides a configuration apparatus, including units or means configured to perform steps in any implementation of any one of the foregoing aspects.

According to still another aspect, this application provides a configuration apparatus, including at least one processing element and at least one storage element, where the at least one storage element is configured to store a program and data, and the at least one processing element is configured to perform the method provided in any implementation of any one of the foregoing aspects.

According to still another aspect, this application provides a computer program, where when being run by a processor, the program is used to perform the method in any implementation of any one of the foregoing aspects.

According to still another aspect, a computer readable storage medium is provided, including the foregoing program.

According to still another aspect, a communications system is provided, including any one of the foregoing configuration apparatuses.

In addition, the embodiments of this application further provide an RRC message transmission method and apparatus, and a system, in the expectation of further improving uplink RRC message transmission reliability when an SRB can be established on a secondary node. Moreover, the RRC message transmission method and apparatus, and the system may be combined with the foregoing configuration method and apparatus, and the foregoing system.

According to an aspect, an RRC message transmission method is provided, applied to a communications system. The communications system includes a master node and a secondary node that jointly provide a service for a terminal. The method includes: receiving, by the terminal, a downlink RRC message of the secondary node, where the downlink RRC message is received by the master node from the secondary node and sent to the terminal, or the downlink RRC message is sent by the secondary node to the terminal; and sending, by the terminal, an uplink RRC message, where the uplink RRC message is a response message for the downlink RRC message, and a path on which the terminal sends the uplink RRC message is the same as a path on which the terminal receives the downlink RRC message. To be specific, when the downlink RRC message is received by the master node from the secondary node and sent to the terminal, the uplink RRC message is sent by the terminal to the master node, and then sent by the master node to the secondary node. Alternatively, when the downlink RRC message is sent by the secondary node to the terminal, the uplink RRC message is sent by the terminal to the secondary node. The "sent" herein means being directly sent without being forward by the master node.

According to another aspect, an RRC message transmission method is provided, applied to a communications system. The communications system includes a master node and a secondary node that jointly provide a service for a terminal. The method includes: obtaining or generating, by the master node, uplink RRC configuration information of the secondary node, where the uplink RRC configuration information is used to configure a manner in which the terminal sends an uplink RRC message for the secondary node; and sending, by the master node, the uplink RRC configuration information to the terminal, so that the terminal sends the uplink RRC message based on the uplink RRC configuration information. The master node may obtain the uplink RRC configuration information from the secondary node.

According to still another aspect, an RRC message transmission method is provided, applied to a communications system. The communications system includes a master node and a secondary node that jointly provide a service for a terminal. The method includes: receiving, by the terminal, uplink RRC configuration information of the secondary node from the master node, where the uplink RRC configuration information is used to configure a manner in which the terminal sends an uplink RRC message for the secondary node; and sending, by the terminal, the uplink RRC message for the secondary node based on the uplink RRC configuration information.

In an implementation, the sending manner of the uplink RRC message includes: sending, by the terminal, the uplink RRC message for the secondary node to the secondary node; or sending, by the terminal, the uplink RRC message for the secondary node to the secondary node through the master node; or sending, by the terminal, the uplink RRC message for the secondary node to the secondary node, where the uplink RRC message is a response message for a downlink RRC message of the secondary node; or sending, by the terminal, the uplink RRC message for the secondary node to the secondary node through the master node, where the uplink RRC message is a response message for a downlink RRC message of the secondary node; or sending, by the terminal based on a result of measuring a cell of the secondary node, the uplink RRC message for the secondary node to the secondary node directly or through the master node; or sending, by the terminal, the uplink RRC message for the secondary node on a same path as a downlink RRC message of the secondary node.

Optionally, when the RRC message transmission method is combined with the foregoing configuration method, the foregoing configuration information for the SRB may include the uplink RRC configuration information, or both the configuration information for the SRB and the uplink RRC configuration information may be sent to the terminal by using an RRC connection reconfiguration message of the master node.

Optionally, when the terminal sends, based on the result of measuring the cell of the secondary node, the uplink RRC message for the secondary node to the secondary node directly or through the master node, the foregoing uplink RRC configuration information may include a threshold. When a measurement value obtained by the terminal by measuring the cell of the secondary node is greater than the threshold, the terminal sends the uplink RRC message for the secondary node to the secondary node. When a measurement value obtained by the terminal by measuring the cell of the secondary node is less than the threshold, the terminal sends the uplink RRC message for the secondary node to the secondary node through the master node. When a measurement value obtained by the terminal by measuring the cell of the secondary node is equal to the threshold, the terminal may send the uplink RRC message for the secondary node to the secondary node directly or through the master node.

According to still another aspect, this application provides an RRC message transmission apparatus, including units or means configured to perform steps in any implementation of any one of the foregoing aspects.

According to still another aspect, this application provides an RRC message transmission apparatus, including at least one processing element and at least one storage element, where the at least one storage element is configured to store a program and data, and the at least one processing element is configured to perform the method provided in any implementation of any one of the foregoing aspects.

According to still another aspect, this application provides a computer program, where when being run by a processor, the program is used to perform the method in any implementation of any one of the foregoing aspects.

According to still another aspect, a computer readable storage medium is provided, including the foregoing program.

According to still another aspect, a communications system is provided, including any one of the foregoing configuration apparatuses.

It can be learned that in the foregoing aspects, the uplink RRC message for the secondary node may be transmitted in a manner configured by the master node or may be transmitted on a same path as the downlink RRC message. In this way, unreliability brought by a plurality of uplink RRC message transmission possibilities is alleviated.

In addition, the embodiments of this application further provide a configuration method and apparatus, and a system, in the expectation of further improving mobility management efficiency when an SRB can be established on a secondary node. Moreover, the configuration method and apparatus, and the system may be combined with the foregoing configuration method and apparatus, and the foregoing system.

According to an aspect, a configuration method is provided, applied to a communications system. The communications system includes a master node (MN) and a secondary node (SN) that jointly provide a service for a terminal. The method includes the following steps:

receiving, by the secondary node, measurement configuration information from the master node, where the measurement configuration information is used to configure a condition for triggering the secondary node to send a measurement result to the master node;

receiving, by the secondary node from the terminal, a measurement report obtained by the terminal by measuring a cell of the secondary node; and when the measurement report includes a measurement result meeting the foregoing condition, sending, by the secondary node, the measurement result to the master node.

According to another aspect, a configuration method is provided, applied to a communications system, where the communications system includes an MN and an SN that jointly provide a service for a terminal, and the method includes the following steps:

sending, by the master node, measurement configuration information to the secondary node, where the measurement configuration information is used to configure a condition for triggering the secondary node to send a measurement result to the master node; and receiving, by the master node, a measurement result meeting the foregoing condition from the secondary node, where the measurement result is obtained by the terminal by measuring a cell of the secondary node and reported to the secondary node.

In an implementation, the measurement configuration information includes a threshold, and the foregoing condition is that the measurement result is greater than or equal to the threshold. To be specific, the master node sends the threshold to the secondary node, the secondary node receives the threshold, and when the measurement result is greater than or equal to the threshold, the secondary node sends the measurement result to the master node.

In an implementation, the foregoing method further includes: configuring, by the secondary node, the threshold for the terminal. In this way, a measurement report reported by the terminal is a measurement report meeting the threshold requirement, and the secondary node may directly send a measurement result in the measurement report to the master node, without determining whether the measurement result meets the threshold requirement.

In an implementation, information sent by the secondary node to the master node further includes a cell or beam identifier, that is, a cell or beam identifier corresponding to the measurement result meeting the condition. That is, the foregoing method further includes: sending, by the secondary node, a cell or beam identifier corresponding to the measurement result to the master node.

According to still another aspect, this application provides a configuration apparatus, including units or means configured to perform steps in any implementation of any one of the foregoing aspects.

According to still another aspect, this application provides a configuration apparatus, including at least one processing element and at least one storage element, where the at least one storage element is configured to store a program and data, and the at least one processing element is configured to perform the method provided in any implementation of any one of the foregoing aspects.

According to still another aspect, this application provides a computer program, where when being run by a processor, the program is used to perform the method in any implementation of any one of the foregoing aspects.

According to still another aspect, a computer readable storage medium is provided, including the foregoing program.

According to still another aspect, a communications system is provided, including any one of the foregoing configuration apparatuses.

It can be learned that in the foregoing aspects, the master node can configure the secondary node to report, in a specific condition, the result of measuring the cell of the secondary node by the terminal, thereby improving mobility management performance.

DESCRIPTION OF EMBODIMENTS

The following explains some terms in this application.

(1) A terminal, also referred to as user equipment (UE), is a device that provides voice and/or data connectivity for a user, for example, a handheld device or an in-vehicle device having a wireless connection function. Currently, some terminals are, for example, a mobile phone, a tablet computer, a notebook computer, a palmtop computer, a mobile Internet device (MID), and a wearable device such as a smart watch, a smart band, and a pedometer.

(2) A radio access network (RAN) is a part, in a network, that connects a terminal to a wireless network. A RAN node or device is a node or device in the radio access network, and may also be referred to as a base station. Currently, some RAN nodes are, for example, a gNB, a transmission/reception point (TRP), an evolved NodeB (eNB), a radio network controller (RNC), a NodeB (NB), a base station controller (BSC), a base transceiver station (BTS), a home base station (for example, Home evolved NodeB or Home Node B, HNB), a baseband unit (BBU), or a WiFi access point (AP). In addition, in a network structure, the RAN may include a centralized unit (CU) node and distributed unit (DU) nodes. In this structure, protocol layers of an eNB in Long Term Evolution (LTE) are divided, where functions of some protocol layers are divided to the CU for centralized control, and functions of part or all of remaining protocol layers are divided to the DUs, which are controlled by the CU in a centralized manner.

(3) The term "plurality of" means two or more than two, and other quantifiers are similar thereto. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
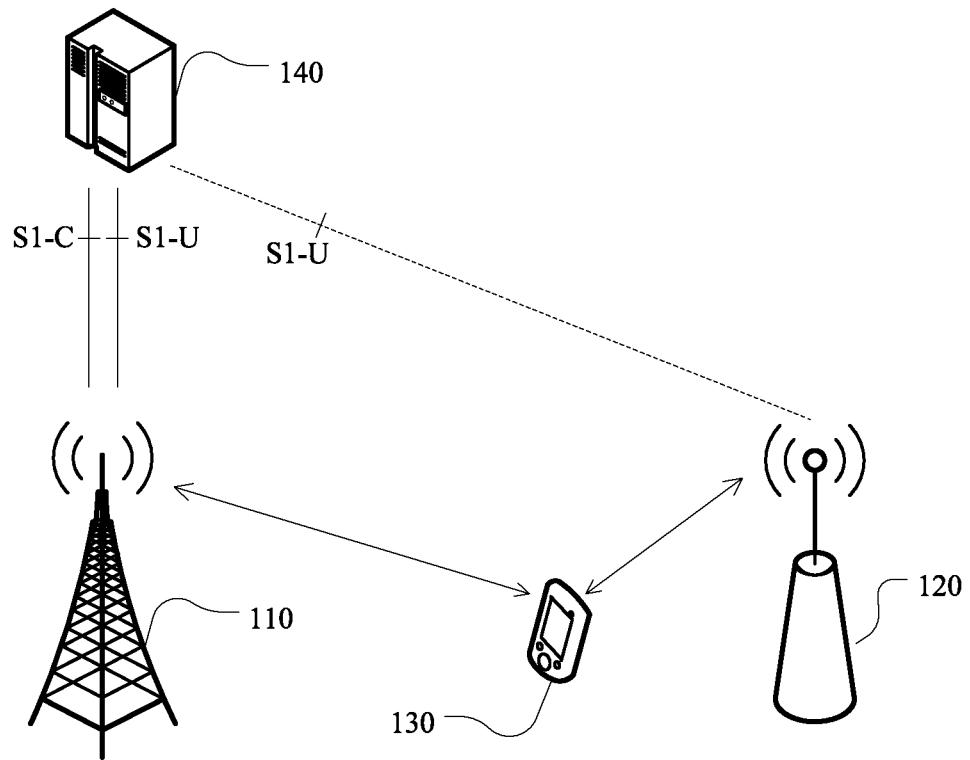
FIG. 1 is a schematic diagram of a dual connectivity scenario according to an embodiment of this application.

Referring to FIG. 1, FIG. 1 is a schematic diagram of a dual connectivity scenario according to an embodiment of this application. As shown in FIG. 1, a RAN node 110 and a RAN node 120 jointly provide a service for a terminal 130. The RAN node 110 is a master node (MN). The RAN node 120 is a secondary node (SN). A control plane connection and a user plane connection exist between the MN 110 and a core network (CN) 140. A user plane connection may or may not exist between the SN 120 and the core network 140. S1-U represents a user plane connection, and S1-C represents a control plane connection. When a user plane connection does not exist between the SN 120 and the core network 140, data for the terminal 130 may be offloaded from the MN 110 to the SN 120 at a Packet Data Convergence Protocol (PDCP) layer. The MN and the SN are also referred to as a master base station and a secondary base station.

Dual connectivity may be implemented between intra radio access technology (intra-RAT) RAN nodes, or may be implemented between inter-RAT RAN nodes. For example, with evolution of wireless communications technologies, dual connectivity may be implemented in a scenario of joint networking of LTE (also referred to as 4G) and New Radio (NR) (also referred to as 5G), and such dual connectivity is referred to as LTE-NR dual connectivity. In this way, a terminal can obtain radio resources from both LTE and NR air interfaces for data transmission, thereby obtaining a transmission rate gain. LTE-NR dual connectivity mainly includes the following three architectures, which are separately described below with reference to FIG. 2(a), FIG. 2(b), and FIG. 2(c), where an interface between a core network and a RAN node is represented by S1, an interface between RAN nodes is represented by X2 (which may also be referred to as an Xn interface). Such a representation form is merely an example, and is not intended to limit this application.

Figure 2A:
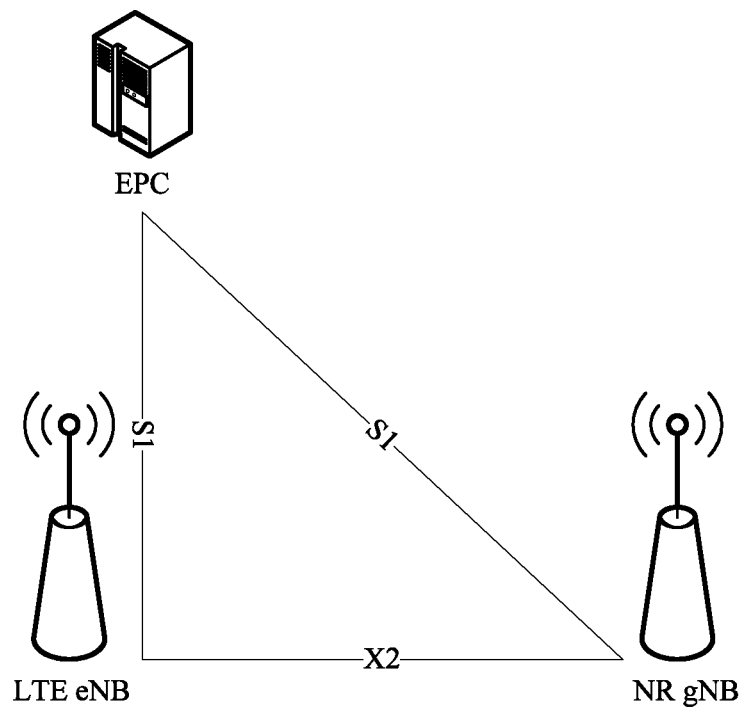
FIG. 2(a) is a schematic diagram of an LTE-NR dual connectivity scenario according to an embodiment of this application.

Referring to FIG. 2(a), FIG. 2(a) is a schematic diagram of an LTE-NR dual connectivity scenario according to an embodiment of this application. As shown in FIG. 2(a), an LTE eNB serves as an MN, and control plane and user plane connections may be established for a terminal between the MN and an evolved packet core (EPC) of an LTE system. An NR gNB serves as an SN, and a user plane connection may be established between the SN and the EPC. It can be learned that in the scenario shown in FIG. 2(a), the LTE eNB is used as an anchor, and the LTE eNB connects to the LTE core network.

Figure 2B:
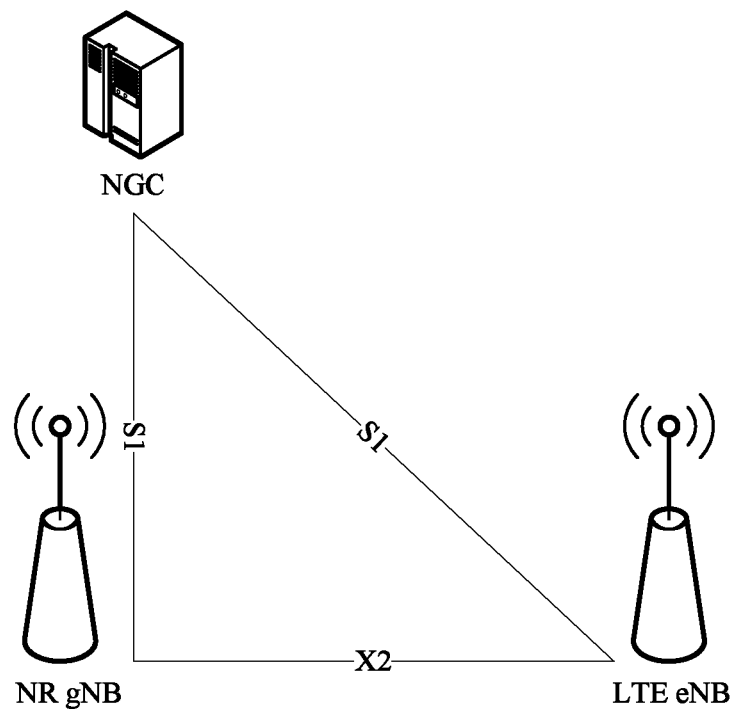
FIG. 2(b) is a schematic diagram of another LTE-NR dual connectivity scenario according to an embodiment of this application.

Referring to FIG. 2(b), FIG. 2(b) is a schematic diagram of another LTE-NR dual connectivity scenario according to an embodiment of this application. A difference from FIG. 2(a) lies in that an NR gNB is used as an anchor, and the NR gNB connects to an NR core network, which may be referred to as a next generation core (NGC) or a 5G core network (5th Generation Core Network, 5G-CN). That is, the NR gNB serves as an MN, and control plane and user plane connections may be established for a terminal between the MN and the NGC. An LTE eNB serves as an SN, and a user plane connection may be established between the SN and the NGC.

Figure 2C:
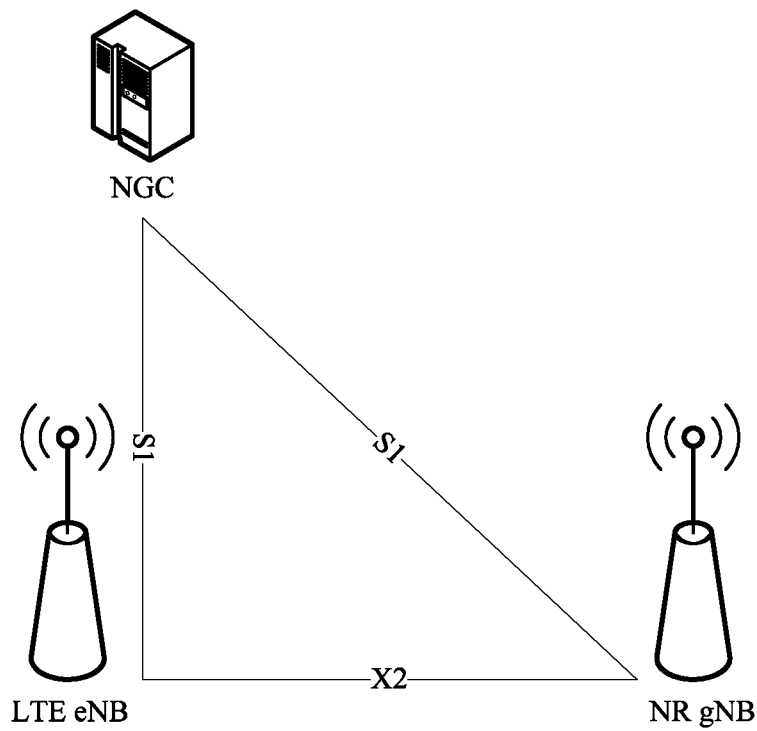
FIG. 2(c) is a schematic diagram of still another LTE-NR dual connectivity scenario according to an embodiment of this application.

Referring to FIG. 2(c), FIG. 2(c) is a schematic diagram of still another LTE-NR dual connectivity scenario according to an embodiment of this application. Like FIG. 2(a), an LTE eNB is used as an anchor, and a difference from FIG. 2(a) lies in that the LTE eNB connects to an NR core network NGC. That is, the LTE eNB serves as an MN, and control plane and user plane connections may be established for a terminal between the MN and the NGC. An NR gNB serves as an SN, and a user plane connection may be established between the SN and the NGC.

In the foregoing three scenarios, the user plane connection may not be established between the SN and the core network, and data is transferred through the MN. For example, in a downlink direction, data for a terminal reaches the MN first, and the MN offloads the data for the terminal to the SN at a PDCP layer. A form of the offloaded data is, for example, a PDCP protocol data unit (PDU).

In dual connectivity, a data radio bearer (DRB) may be provided only by the MN or the SN, or may be provided by both the MN and the SN. When the DRB is provided only by the MN, the DRB is referred to as a master cell group (MCG) bearer. When the DRB is provided only by the SN, the DRB is referred to as a secondary cell group (SCG) bearer. When the DRB is provided by both the MN and the SN, the DRB is referred to as a split bearer.

Figure 3A:
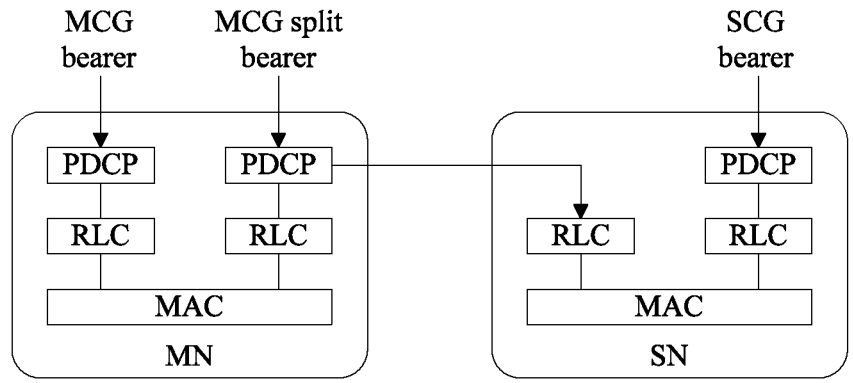
FIG. 3(a) is a schematic architectural diagram of a wireless protocol of dual connectivity according to an embodiment of this application.
Figure 3B:
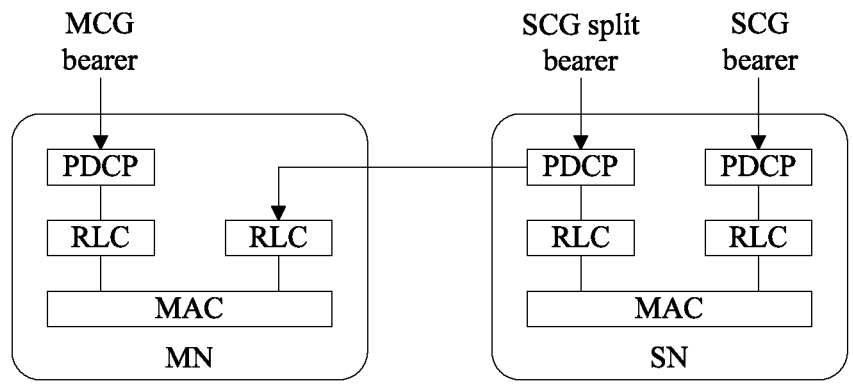
FIG. 3(b) is a schematic architectural diagram of another wireless protocol of dual connectivity according to an embodiment of this application.

Descriptions are provided below with reference to FIG. 3(a) and FIG. 3(b). FIG. 3(a) and FIG. 3(b) are respectively schematic architectural diagrams of wireless protocols of dual connectivity according to an embodiment of this application. As shown in FIG. 3(a) and FIG. 3(b), when a bearer is provided only by an MN, that is, a data stream flows from a core network only to the MN, the bearer is an MCG bearer. When a bearer is provided only by an SN, that is, a data stream flows from a core network only to the SN, the bearer is an SCG bearer. When a bearer is provided by both an MN and an SN, that is, a data stream is offloaded at the MN or the SN, the bearer is a split bearer. For differentiation, a bearer split at the MN may be referred to as an MCG split bearer (shown in FIG. 3(a)), and a bearer split at the SN may be referred to as an SCG split bearer (shown in FIG. 3(b)).

In a current LTE dual connectivity system, a signaling radio bearer (SRB) is provided by an MN, and an SN does not provide an SRB. The SRB is established only between a terminal and the MN for radio resource control (RRC) message transmission, and all RRC messages of the SN are sent to the terminal through the MN. However, with evolution of technologies, the SN is expected to be capable of independently providing an SRB, so that fast RRC configuration can be implemented. Therefore, an RRC message can be transmitted not only between the MN and the terminal, but also between the SN and the terminal. In this case, three types of RRC messages may exist.

Figure 4:
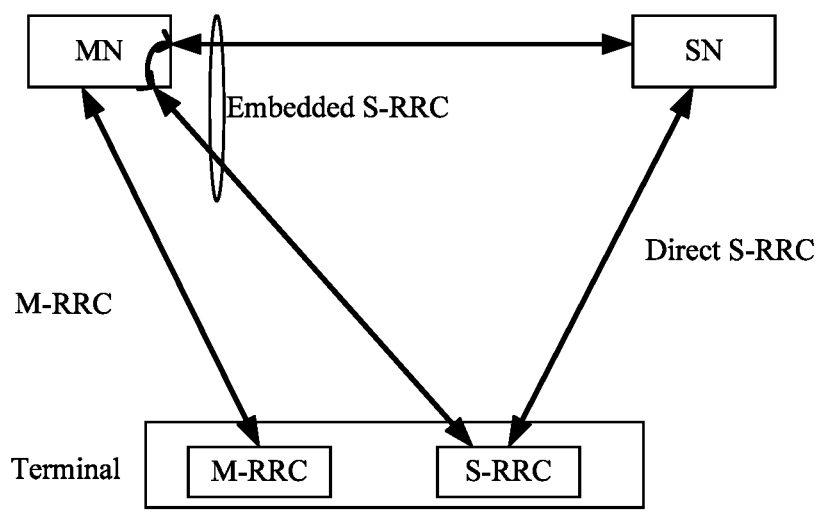
FIG. 4 is a schematic diagram of an RRC message according to an embodiment of this application.

Referring to FIG. 4, FIG. 4 is a schematic diagram of an RRC message according to an embodiment of this application. As shown in FIG. 4, when an SN can provide an SRB, there are three types of RRC messages: a master RRC (M-RRC) message, a direct secondary node RRC (direct S-RRC) message, and an embedded secondary node RRC (embedded S-RRC) message. The M-RRC message is used for an MN, and is directly transmitted between the MN and a terminal, that is, directly terminated between the MN and the terminal. The direct S-RRC message is used for the SN, and is directly transmitted between the SN and the terminal. The embedded S-RRC message is used for the SN, and the embedded S-RRC message is encapsulated in the M-RRC message, and may be used as an RRC container. The RRC container is an RRC PDU meeting an SN protocol requirement. It can be learned that two types of RRC messages, that is, the embedded S-RRC message and the direct S-RRC message, may be used for the SN.

However, currently, there is no available method for establishing an SRB on an SN. In addition, an RRC message between a terminal and an SN may be transferred by using an SRB on an MN, or may be directly transferred by using an SRB on the SN, but currently, there is also no available method for selecting a transfer manner of the RRC message between the terminal and the SN.

In view of this, the following embodiment provides a configuration method, to establish an SRB on an SN, so that an RRC message can be directly transmitted between a terminal and the SN.

Figure 5:
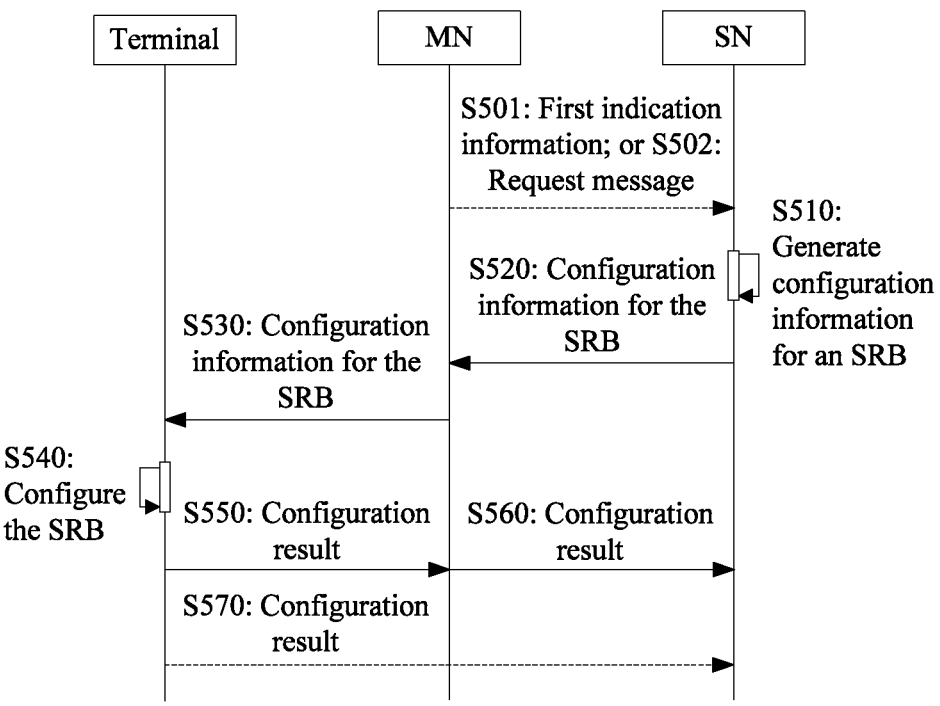
FIG. 5 is a schematic diagram of a configuration method according to an embodiment of this application.

Referring to FIG. 5, FIG. 5 is a schematic diagram of a configuration method according to an embodiment of this application. As shown in FIG. 5, the method includes the following steps.

S510: An SN generates configuration information for an SRB, where the SRB is used to transmit an RRC message between the SN and a terminal. That is, the RRC message may be directly transmitted by the SN to the terminal by using the SRB, without being forwarded by an MN, or the RRC message may be directly transmitted by the terminal to the SN by using the SRB, without being forwarded by an MN. The configuration information for the SRB may also be referred to as SRB configuration information or direct S-RRC configuration information. A name of the configuration information for the SRB is not limited in this application. The configuration information for the SRB (the SRB configuration information or the direct S-RRC configuration information) is used to configure the SRB for directly transmitting the RRC message between the terminal and the SN. That is, the configuration information for the SRB (the SRB configuration information or the direct S-RRC configuration information) is used by the terminal to configure the SRB based on the configuration information, so that the RRC message is directly transmitted between the terminal and the secondary node.

S520: The SN sends the configuration information for the SRB to an MN.

The MN receives the configuration information for the SRB of the SN, and performs the following operation:

S530: The MN sends the configuration information for the SRB of the SN to the terminal.

The terminal receives the configuration information for the SRB of the SN, and performs the following operation:

S540: The terminal configures the SRB by using the configuration information for the SRB of the SN, and sends a configuration result to the SN. The terminal may send the configuration result to the SN through the MN, or may directly send the configuration result to the SN. Then, the terminal may perform step S550 or S570.

S550: The terminal sends the result of configuring the SRB to the MN, so that the configuration result may be sent to the SN through the MN.

The MN receives the configuration result, and performs the following step:

S560: The MN sends the configuration result to the SN.

S570: The terminal sends the configuration result to the SN. That is, the terminal directly sends the result of configuring the SRB of the SN to the SN by using the configured SRB.

In this way, a configuration for the SRB by the SN can be sent to the terminal through the MN, and after the terminal configures the SRB, the terminal sends the configuration result to the SN directly or through the MN. In this way, an RRC message can be directly transmitted between the SN and the terminal, and this is beneficial to improvement in RRC message processing efficiency.

In step S510, the SN may generate the configuration information for the SRB based on an instruction of the MN, or may generate the configuration information for the SRB by default when learning that the MN requests to add the SN as an SN. That is, before step S510, the foregoing method may further include step S501 or step S502:

S501: The MN sends first indication information to the SN, where the first indication information is used to instruct the SN to establish an SRB or is used to instruct the SN to generate configuration information for an SRB. The SN receives the first indication information, and generates the configuration information for the SRB based on the first indication information. When the first indication information is used to instruct the SN to establish the SRB, the SN generates the configuration information for the SRB, and sends the configuration information for the SRB to the terminal through the MN, to complete SRB configuration and complete SRB establishment. When the first indication information is used to instruct the SN to generate the configuration information for the SRB, it indicates that the SRB is to be established on the SN; therefore, the SN generates the configuration information for the SRB, and sends the configuration information for the SRB to the terminal through the MN, to complete SRB configuration and complete SRB establishment. In this way, the secondary node can establish the SRB based on an instruction of the master node, and this helps the master node to control establishment of the SRB of the secondary node based on a requirement, making it more flexible to control establishment of the SRB of the secondary node.

S502: The SN receives a request message from the MN, where the request message is used to request to add the SN as an SN. The SN receives the request message, learns that the SN is to be added as an SN, and when the SN is added as an SN, establishes an SRB by default, that is, generates configuration information for the SRB by default. That is, when the SN learns that the SN is requested to be added as an SN, the SN may generate the configuration information for the SRB, without being instructed, by the MN by using an information element, to generate the configuration information for the SRB. In this way, information elements transmitted between the MN and the SN can be reduced. When an SN is added, an SRB is established on the SN by default.

Optionally, the first indication information in step S501 may be carried in an addition request message sent by the MN to the SN, where the addition request message is used to request to add an SN. Alternatively, the first indication information may be carried in a modification request message sent by the MN to the SN, where the modification request message is used to request to modify a configuration of a secondary node. This is further described in a subsequent embodiment, and details are not described herein.

In addition, in step S510, the configuration information for the SRB that is generated by the SN may be an RRC protocol data unit (PDU) or a part of the RRC PDU. For example, if the MN is a RAN node in an LTE system and the SN is a RAN node in an NR system, the SN generates an NR RRC PDU, where the NR RRC PDU includes at least the configuration information for the SRB of the SN. The NR RRC PDU may be an NR RRC connection reconfiguration message. In addition, security processing may be performed on the configuration information for the SRB. For example, the SN performs integrity protection and/or encryption processing on the configuration information for the SRB, and then sends the configuration information for the SRB to the MN. The MN sends the configuration information for the SRB to the terminal. After the terminal receives the configuration information for the SRB, the terminal performs integrity check and/or decryption on the configuration information for the SRB.

The configuration information for the SRB may include at least one of the following information: an SRB identifier, a radio link control (RLC) layer configuration of the SRB, a logical channel configuration, and an SRB security parameter. The SRB security parameter may include, for example, at least one of the following parameters: information about a security algorithm and a parameter used to derive a security key. The security algorithm includes, for example, an encryption and/or integrity protection algorithm. The information about the security algorithm may be information used to indicate the security algorithm, for example, may be an algorithm indication or an algorithm identifier, or may be the security algorithm. Alternatively, the SN may not send the SRB security parameter, and the terminal and the SN preconfigure security parameters that maintain consistent. In an optional manner, the SN and the MN use a same security parameter, for example, a same encryption and/or integrity protection algorithm. Alternatively, the security parameter is sent by the MN to the terminal, and does not need to be carried in the configuration information for the SRB. In addition, content carried in the security parameter may be partly carried in the configuration information for the SRB, and partly preconfigured or sent by the MN to the terminal.

In step S520, the SN may add the configuration information for the SRB of the SN to an acknowledgment message sent by the SN to the MN, where the acknowledgment message is a response message for the addition request message used to request to add an SN, or a response message for the modification request message used to request to modify a configuration of an SN. In addition, in step S530, the MN may send the configuration information for the SRB of the SN to the terminal by using an RRC connection reconfiguration message of the MN.

The configuration information for the SRB of the SN may be sent to the MN as an RRC container. The container is, for example, an RRC PDU. In addition, the container may be carried in a message sent by the SN to the MN. After the MN parses out the container from the message, the MN directly forwards the container to the terminal without parsing the container. For example, the container is carried in an acknowledgment message sent by the SN to the MN, where the acknowledgment message is a response message for the request message used to request to add an SN, or a response message for the modification request message used to request to modify a configuration of an SN.

In step S540, the terminal generates a corresponding RRC entity and a Layer 2 entity (for example, an RLC entity) based on the configuration information for the SRB, and activates security processing for direct RRC transmission between the terminal and the SN, to transmit an RRC message of the SN. The entities herein are logical entities, and used to implement RRC and Layer 2 functions. When the configuration information for the SRB is carried in the RRC connection reconfiguration message of the MN, after the terminal receives the RRC connection reconfiguration message of the MN, the terminal extracts the configuration information for the SRB from the RRC connection reconfiguration message, and parses the configuration information for the SRB by using an RRC format of the SN. If security processing, for example, integrity protection and/or encryption, is performed on the configuration information for the SRB by the SN, the terminal may perform security processing, for example, integrity check and/or decryption, on the configuration information for the SRB by using the security parameter.

In step S550, the terminal may add the configuration result to an RRC connection reconfiguration complete message, and send the RRC connection reconfiguration complete message to the MN. The configuration result may also be referred to as a direct S-RRC configuration result or an SN RRC configuration result. For example, the configuration result may be successful or failed, to indicate that the result of configuring the SRB of the SN by the terminal is successful or failed. For the configuration result, the terminal may send second indication information to the MN, where the second indication information is used to indicate the configuration result, so that when the MN cannot parse the configuration result, the MN may learn, based on the second indication information, the result of configuring the SRB of the SN by the terminal. The second indication information and the configuration result may be carried in a same message sent by the terminal to the MN, for example, carried in the RRC connection reconfiguration complete message sent by the terminal to the MN.

In addition, the configuration result may be the RRC connection reconfiguration complete message. For example, when the MN receives the RRC connection reconfiguration complete message, it is considered that configuration of the SRB of the SN (or SN RRC configuration or direct S-RRC configuration) succeeds.

In addition, when the RRC connection reconfiguration message carries MN RRC configuration information, the UE separately performs configuration of the MN and configuration of the SN, and returns configuration results to the MN by using the RRC connection reconfiguration complete message.

In step S560, the MN may send the configuration result to the SN by using an SN reconfiguration complete message. In addition, the configuration result may be sent to the SN as a container. Alternatively, the SN reconfiguration complete message may be the configuration result. When the SN receives the SN reconfiguration complete message, it is considered that the configuration succeeds.

Optionally, the MN may parse the configuration result, and only when the configuration result is successful, send data for the terminal to the SN or request a core network to send corresponding data to the SN. Alternatively, when the configuration result cannot be parsed by the master node, for example, the configuration result is sent to the master node in a form of an RRC container meeting an SN format requirement, the master node may determine, based on the second indication information, the result of configuring the SRB of the secondary node by the terminal, and when the configuration result is successful, send data for the terminal to the SN or request a core network to send corresponding data to the SN. When the configuration result is failed, the MN may reselect an SN for dual connectivity, or modify the SN, or the MN does not send data to the SN, and the SN performs reconfiguration by itself. Herein, the data sent by the core network to the SN may be a part or all of the data for the terminal. That is, whether the core network sends all the data for the terminal to the SN is not limited. The core network may send a part of the data to the SN, and send a part of the data to the MN, so that data offloading is completed at the core network.

After the SN receives the result, sent by the MN, of configuring the SRB of the SN by the terminal, if the SN finds that the configuration result is successful, configuration of the SRB on the SN is completed for the terminal.

In addition, if the SN RRC configuration result is failed, the MN may trigger an SN release procedure, that is, send an SN release command to the SN. The SN release command may include indication information indicating that "SN RRC configuration fails".

Initial configuration of dual connectivity is completed by the MN, and the SRB on the SN may be established in an initial configuration process of dual connectivity. A description is provided below with reference to an accompanying drawing.

Figure 6:
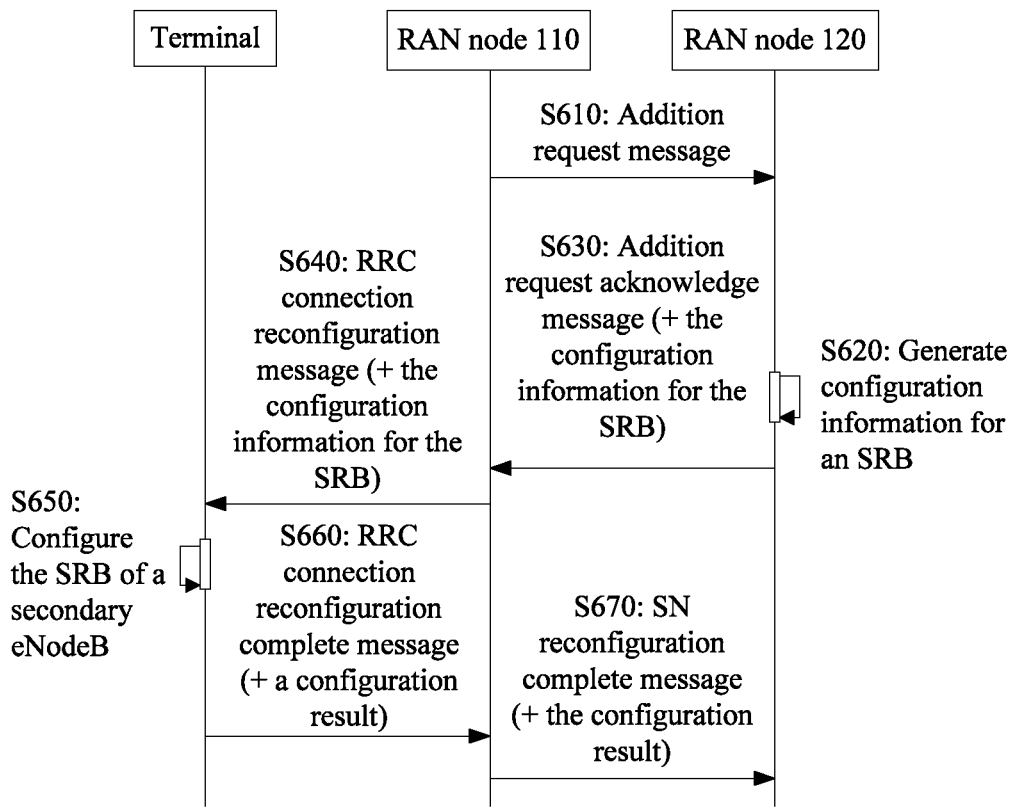
FIG. 6 is a schematic diagram of a radio bearer establishment method according to an embodiment of this application.

Referring to FIG. 6, FIG. 6 is a schematic diagram of a radio bearer establishment method according to an embodiment of this application. As shown in FIG. 6, the method includes the following steps.

S610: A RAN node 110 sends an addition request message to a RAN node 120, where the addition request message is used to request to add the RAN node 120 as an SN.

Optionally, the addition request message may carry the first indication information in the foregoing embodiment, to instruct the RAN node 120 to establish an SRB or generate configuration information for an SRB. Alternatively, the addition request message may not carry the first indication information, but instead when the RAN node 120 receives the addition request message, the RAN node 120 establishes an SRB by default, to generate configuration information for the SRB by default.

After the RAN node 120 receives the addition request message, the RAN node 120 learns that the RAN node 110 is to add the RAN node 120 as an SN, and then performs SCG configuration. In this embodiment, in a process in which the RAN node 120 performs SCG configuration, the RAN node 120 generates SCG configuration information, and sends the generated SCG configuration information to the RAN node 110, where the SCG configuration information carries the configuration information for the SRB (or direct S-RRC configuration information). That is, the RAN node 120 performs the following steps:

S620: The RAN node 120 generates configuration information for an SRB.

S630: The RAN node 120 adds the generated configuration information for the SRB to an addition request acknowledge message, and sends the addition request acknowledge message to the RAN node 110, where the addition request acknowledge message is a response message for the addition request message.

Like the foregoing embodiment, the configuration information for the SRB of the SN may be carried as a container in the addition request acknowledge message sent to the MN. For example, the configuration information for the SRB may be sent to the MN as an RRC PDU of the SN or a part of the RRC PDU.

The RAN node 110 receives the addition request acknowledge message sent by the RAN node 120, and performs the following operation:

S640: The RAN node 110 adds the configuration information for the SRB of the RAN node 120 to an RRC connection reconfiguration message, and sends the RRC connection reconfiguration message to a terminal.

For example, if the MN is a RAN node in LTE and the SN is a RAN node in NR, the MN sends an LTE RRC connection reconfiguration message to the terminal. The LTE RRC connection reconfiguration message includes the configuration information for the SRB of the SN, for example, includes the RRC PDU of the SN, that is, the MN forwards the RRC PDU of the SN to the terminal. Even when the configuration information for the SRB of the SN is a part of the RRC PDU, the MN can still forward the complete RRC PDU to the terminal, to send the configuration information for the SRB of the SN to the terminal.

After the terminal receives the RRC connection reconfiguration message, the terminal parses out the configuration information for the SRB of the RAN node 120 from the RRC connection reconfiguration message, and performs the following operations:

S650: The terminal configures the SRB of the RAN node 120 by using the configuration information for the SRB of the RAN node 120, for example, establishes an RRC entity and a Layer 2 entity, and activates security processing for direct RRC transmission between the terminal and the SN, to generate an RRC connection reconfiguration complete message. This process is a process of adding the SRB by the terminal, and includes establishing a PDCP instance by using a security configuration of the SN, establishing an RLC instance based on an RLC configuration, establishing a logical channel based on a logical channel configuration, and the like. The instance is a logical unit, and used to perform an operation meeting a PDCP or RLC layer protocol. Then, step S660 is performed.

S660: The terminal adds a result of configuring the SRB of the RAN node 120 to an RRC connection reconfiguration complete message, and sends the RRC connection reconfiguration complete message to the RAN node 110.

When the RRC connection reconfiguration message sent by the RAN node 110 includes configuration information of the MN, the terminal separately performs configuration of the MN and configuration of the SN. The configuration of the MN is performed based on the configuration information of the MN in the RRC connection reconfiguration message, and may include configuration of an SRB and/or a DRB or the like of the MN. The configuration of the SN is performed based on configuration information of the SN in the RRC connection reconfiguration message, and includes configuration of the SRB of the SN. When configuration is completed, the terminal may send MN and SN configuration results to the MN by using the RRC connection reconfiguration complete message.

Optionally, for the SN configuration result, the terminal may add the foregoing second indication information to the RRC connection reconfiguration complete message, to indicate the result of configuring the SRB of the SN by the terminal.

The RAN node 110 receives the RRC connection reconfiguration complete message, parses out the result of configuring the SRB of the SN by the terminal from the RRC connection reconfiguration complete message, and performs the following step:

S670: The RAN node 110 sends the configuration result to the RAN node 120. The RAN node 110 may send the configuration result to the RAN node 120 by using an SN reconfiguration complete message.

Optionally, the RAN node 110 may send the configuration result to the RAN node 120 in a form of a container. In addition, optionally, the RAN node 110 may parse the configuration result, and only when the configuration result is successful, send data for the terminal to the RAN node 120, that is, the SN, or request a core network to send data for the terminal to the SN.

In this way, the SRB is established on the SN for the terminal.

It can be learned that the method shown in FIG. 5 may be completed in an initial configuration process of dual connectivity. The configuration information for the SRB of the SN is sent to the MN by using the addition request acknowledge message, and sent to the terminal by using the RRC connection reconfiguration message of the MN. Then, the terminal configures the SRB of the SN by using the configuration information for the SRB of the SN, and sends the configuration result to the MN by using the RRC connection reconfiguration complete message. The MN sends the configuration result to the SN by using the SN reconfiguration complete message. In this way, when initial configuration of dual connectivity is completed, the SRB is established on the SN at the same time, thereby saving signaling and improving communication efficiency.

In addition, the RRC connection reconfiguration complete message may be the configuration result, and is sent by the terminal to the MN when configuration succeeds. In addition, the SN reconfiguration complete message may be the configuration result, and is sent by the MN to the SN when configuration succeeds.

In the embodiment shown in FIG. 6, the SRB on the SN is configured in the initial configuration process of dual connectivity. In another embodiment, an SRB on an SN may be separately configured. For example, only a DRB on the SN may be configured in an initial configuration process of dual connectivity, and in a DC process, an MN or the SN triggers configuration or establishment of the SRB. In addition, the SRB on the SN may be configured in another configuration process, for example, in an SN modification process. A description is provided below with reference to FIG. 7.

Figures 7, 8:
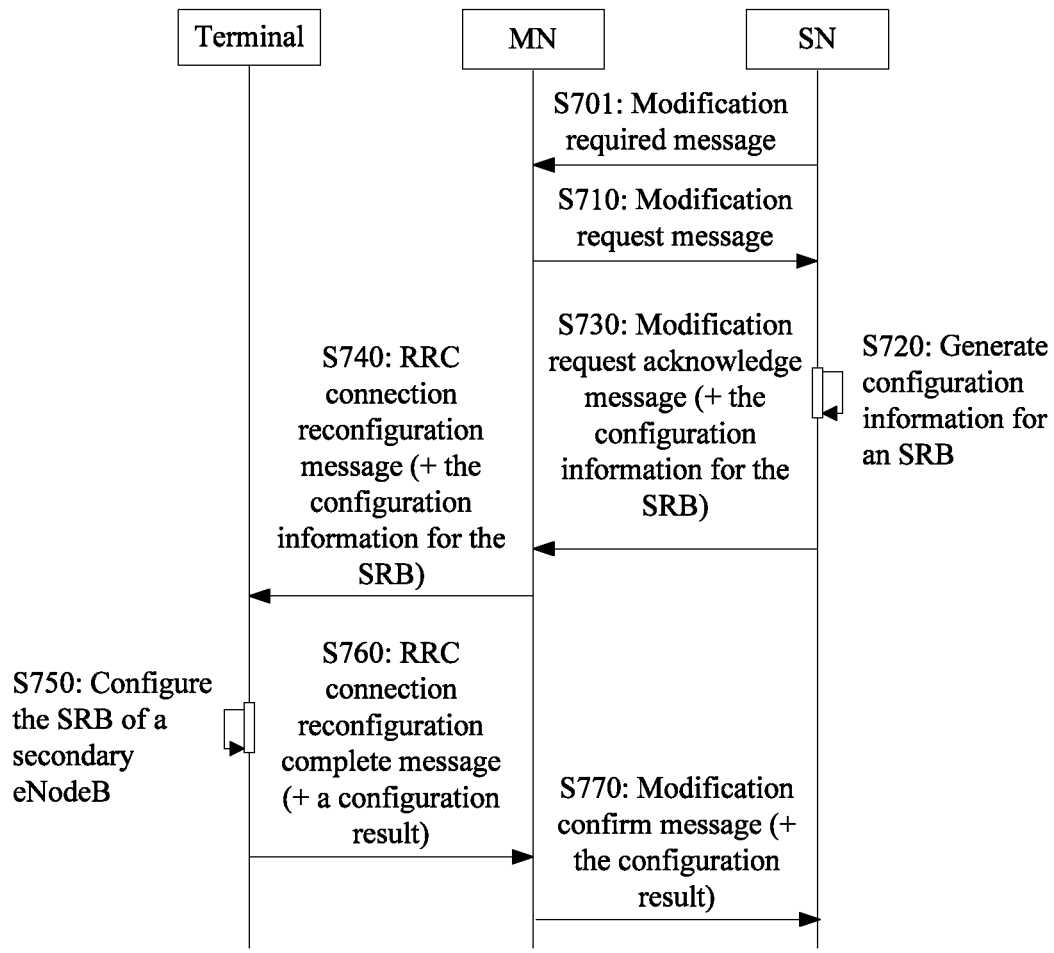
FIG. 7 is a schematic diagram of a configuration method according to an embodiment of this application.
FIG. 8 is a schematic format diagram of a parameter COUNT according to an embodiment of this application.

Referring to FIG. 7, FIG. 7 is a schematic diagram of a configuration method according to an embodiment of this application. As shown in FIG. 7, the method includes the following steps.

S710: An MN sends a modification request message to an SN, where the modification request message is used to request to modify a configuration of an SN, for example, request to establish some bearers on the SN, or request to modify an SCG bearer or an SCG part of a split bearer, or request to add or release an SCG cell. In this embodiment, the SN is requested to generate configuration information for an SRB, and allocate a corresponding radio resource.

Optionally, the modification request message may carry the first indication information in the foregoing embodiment, to instruct the SN to establish the SRB or generate the configuration information for the SRB.

After the SN receives the modification request message, the SN parses out the first indication information, and performs SCG configuration based on the first indication information. In this embodiment, in a process in which the SN performs SCG configuration, the SN generates SCG configuration information, and sends the generated SCG configuration information to the MN. The SCG configuration information carries the configuration information for the SRB (or direct S-RRC configuration information). That is, the SN performs the following steps:

S720: The SN generates configuration information for an SRB.

S730: The SN adds the generated configuration information for the SRB to a modification request acknowledge message, and sends the modification request acknowledge message to the MN. The modification request acknowledge message is a response message for the modification request message.

A form or content of the configuration information for the SRB of the SN is the same as that in the foregoing embodiment, and details are not described herein again.

The MN receives the modification request acknowledge message sent by the SN, and performs steps S740 to S760. Steps S740 to S760 are similar to steps S640 to S660 in FIG. 6, and details are not described herein again.

In step S760, the MN receives an RRC connection reconfiguration complete message, parses out a result of configuring the SRB of the SN by the terminal from the RRC connection reconfiguration complete message, and performs the following step:

S770: The MN sends the configuration result to the SN, where the MN may send the configuration result to the SN by using an SN modification confirm message.

Optionally, the MN may send the configuration result to the SN in a form of a container. In addition, optionally, the MN may parse the configuration result, and only when the configuration result is successful, send data for the terminal to the SN or request a core network to send data for the terminal to the SN.

In this way, the SRB is established on the SN for the terminal.

The foregoing SN modification is triggered by the MN. Optionally, the SN modification may be triggered by the SN. In this case, different from the foregoing embodiment, before step S710, the method may further include step S701: The SN sends a modification required message to the MN, where the modification required message is used to request the MN to allow the SRB to be established between the SN and the terminal or allow an RRC message to be transmitted between the SN and the terminal.

Optionally, the modification required message carries indication information, where the indication information is used to instruct the MN to send security information used for the SRB of the SN to the SN.

The security information is described in detail in the following embodiment, and details are not described herein.

It can be learned that the method shown in FIG. 5 may be completed in dual connectivity, for example, in an SN modification process. The configuration information for the SRB of the SN is sent to the MN by using the modification request acknowledge message, and sent to the terminal by using the RRC connection reconfiguration message of the MN. Then, the terminal configures the SRB of the SN by using the configuration information for the SRB of the SN, and sends the configuration result to the MN by using the RRC connection reconfiguration complete message. The MN sends the configuration result to the SN by using the SN modification confirm message. In this way, when an SN modification of dual connectivity is completed, the SRB is established on the SN at the same time, thereby saving signaling and improving communication efficiency.

In the foregoing embodiments, the MN may further send security information used for the SRB of the SN (or referred to as security information for direct S-RRC) to the SN. The security information includes at least one of the following: a security key and information about a security algorithm. The security algorithm includes an encryption algorithm and/or an integrity protection algorithm. The information about the security algorithm may be information used to indicate the security algorithm, for example, may be an algorithm indication or an algorithm identifier, or may be the security algorithm. In this way, the SN may perform security processing for the SRB of the SN by using the security information, for example, perform encryption/decryption or integrity protection/integrity check. The MN may send the security information to the SN before the SN generates the configuration information for the SRB, that is, before the MN receives the configuration information for the SRB of the SN. After the SN generates the configuration information for the SRB, the SN may perform security processing on the configuration information for the SRB by using the security information, for example, perform integrity protection and/or encryption. If the SRB on the SN is established in an initial configuration process of dual connectivity, the security information may be carried in the addition request message in step S610. If the SRB on the SN is established in a dual connectivity process, the security information may be carried in the modification request message in step S710.

Currently, in an MCG split bearer configuration process, the MN does not send the security information to the SN. Because the MN offloads a PDCP data packet to the SN at a PDCP layer, and encryption is completed at the PDCP layer, the SN does not need to encrypt data again. However, in this embodiment, the MN may send the security information to the SN in any scenario, so that the SN performs security processing for the SRB. To be specific, in the MCG split bearer configuration process, that is, when the MN offloads data for the terminal to the SN at the PDCP layer, the MN still sends the security information to the SN.

The security key may be derived based on an access stratum (AS) root key (for example, KeNB) of the MN. For example, when the MN is a RAN node in an LTE system, the security key may be SKeNB derived based on KeNB. The SN selects an encryption/decryption algorithm and an integrity protection/check algorithm according to a local policy. The SN derives, based on the selected algorithms and the security key, a key for encryption/decryption and a key for integrity protection/check, to complete encryption/decryption and integrity protection/check on signaling and data packets carried on the SRB and the DRB. In the LTE system, an initial AS root key is KeNB. A core network device generates KeNB based on a root key KASME and a non-access stratum (NAS) uplink count, and sends the generated KeNB to the RAN node for the RAN node to calculate an AS security key. The RAN node may derive SKeNB based on KeNB and a parameter COUNT, and send SKeNB to the SN.

Referring to FIG. 8, FIG. 8 is a schematic format diagram of a parameter COUNT according to an embodiment of this application. As shown in FIG. 8, the parameter COUNT includes two parts: a high-order hyper frame number (HFN) and a low-order PDCP sequence number (PDCP SN).

Representation forms of an AS root key and a derived key of the AS root key are described above by using those in the LTE system as an example, but are not limited in this application. For example, when the MN is a base station in the LTE system, the AS root key and the derived key of the AS root key are represented as KeNB and SKeNB. When the MN is a base station in a system of another standard, a different form may be used for representation. For example, in a 5G communications system, the AS root key and the derived key of the AS root key may be represented as KgNB and SKgNB, or Kcu and SKcu. Certainly, other representation forms may also be used, and are not enumerated herein, and this application is not limited to the representation forms.

After dual connectivity is configured for the terminal, serving cell groups are divided into an MCG and an SCG. A cell in the MCG belongs to the MN, and a cell in the SCG belongs to the SN. Carrier aggregation (CA) may be configured in the MCG and/or the SCG. In CA of the SCG, an uplink component carrier (CC) is configured for at least one cell, including a primary secondary cell (PSCell), and a physical uplink control channel (PUCCH) resource is configured for the PSCell.

Currently, the PSCell can be changed only when the SCG is changed, that is, a PSCell change is accompanied by key change and random access processes. However, when the SRB is established on the SN, the SRB exists between the terminal and the SN, and independent measurement can be implemented on an SN side. For example, the SN performs measurement configuration on the terminal by using an RRC message, and the terminal performs measurement and reporting accordingly. In this case, the SN may trigger a PSCell change by itself, and the PSCell change is accompanied by key update.

Based on this, in an embodiment, the SN may send a request message to the MN, and then the MN sends an updated key to the SN and the terminal, where the request message is used to request the updated key from the MN. This process causes a specific latency.

As the SRB can be established on the SN, configuration can be directly performed between the SN and the terminal. In this way, fast configuration can be implemented. Further, if the SN can update a key by itself, configuration efficiency on the SN can be further improved.

Based on this, in another embodiment, the MN may send a key group (or a key list) to the SN for the SN to select a key from the key group when updating a key. Optionally, the key group may be carried in the request message in step S502 in FIG. 5, or the addition request message in step S610 in FIG. 6, or the modification request message in step S710 in FIG. 7. In addition, the MN may send the key group based on an instruction of the SN. For example, the SN sends indication information to the MN, to instruct the MN to send the key group to the SN. The indication information may be separately sent, or may be carried in another message. For example, in step S701 in FIG. 7, the SN may send the indication information to the MN. Certainly, the MN may not need to send the key group based on an instruction of the SN, but actively trigger sending of the key group.

In an implementation, the MN sends, to the SN, the key group and a group of count (COUNT) values, that is, a count value group (or referred to as a count value list, COUNT list)

used to derive keys in the key group. The SN receives the key group and the count value group, and selects a new key, that is, a key different from an existing key, from the key group when a key needs to be updated. Then, the SN sends a count value used to derive the key to the terminal, so that the terminal completes synchronous key update.

The SN may sequentially or randomly select the key. When the SN sequentially selects the key, the MN may not send the count value group to the SN, and send the count value group to the terminal. When the SN updates the key, the SN sends notification information to the terminal, to instruct the terminal to update the key, and the terminal sequentially uses a count value for synchronous key update. Alternatively, association information may be set for a key and a count value used to derive the key, to associate the key with the count value. For example, a same sequence number is set for the key and the count value. When the SN randomly selects the key, association information of the selected key is sent to the terminal, so that the terminal accordingly selects the corresponding count value for synchronous key update.

The key herein is a derived key, derived from a root key and a count value. A description about the key is the same as that in the foregoing embodiment, and details are not described herein again.

In addition, in the foregoing embodiments, when the terminal performs MN RRC configuration, but cannot perform SN SRB configuration (or RRC configuration or direct S-RRC configuration), the terminal may send SN SRB configuration failure information to the MN. In addition, the terminal may send an RRC connection re-establishment request message to the SN, where the RRC connection re-establishment request message may be carried in the RRC connection reconfiguration complete message sent to the MN. After the MN receives the RRC connection reconfiguration complete message, the MN sends a modification request message to the SN, and adds the RRC connection re-establishment request message to the modification request message.

After the SN SRB configuration is completed, the SN may directly send an RRC connection reconfiguration message to the terminal for configuration. When the terminal cannot perform the RRC configuration, the terminal triggers an RRC connection re-establishment process between the terminal and the SN according to the prior art, but the process interrupts transmission of data carried on the SN. In view of this problem, in an embodiment of this application, the terminal restores configuration before the RRC connection reconfiguration message is received, that is, works based on the configuration before the RRC connection reconfiguration message is received, does not trigger RRC connection re-establishment, and notifies the SN that latest configuration fails. The terminal may notify, directly or through the MN, the SN that latest configuration fails.

Still referring to FIG. 4, when the SRB is established on the SN to transmit an RRC message between the SN and the terminal, RRC messages between the terminal and a RAN may include an RRC message of the MN (that is, an M-RRC message) and an RRC message of the SN (that is, an S-RRC message). A downlink S-RRC message (that is, an RRC message sent by the SN to the terminal) includes a direct S-RRC message and an embedded S-RRC message. An RRC message (for example, an RRC connection reconfiguration message) that is not related to negotiation between the SN and the MN may be directly sent by the SN to the terminal, or may be sent to the terminal through the MN. That is, an RRC message of a direct S-RRC type may be used, or an RRC message of an embedded S-RRC type may be used. A specific manner or message to be used may be determined by the SN.

There are also two possibilities for sending an uplink S-RRC message. That is, the uplink S-RRC messages (that is, RRC messages sent by the terminal to the SN) includes a direct S-RRC message and an embedded S-RRC message. When the terminal uses both the direct S-RRC message and the embedded S-RRC message, a network side problem may be caused. For example, uplink RRC message transmission reliability decreases. For example, after the terminal sends a measurement report by using the embedded S-RRC message, the terminal sends, in a short time, another measurement report by using the direct S-RRC message. However, due to an air interface latency of the MN and a latency of an interface between the MN and the SN, the measurement report sent by using the embedded S-RRC message may reach the SN later than the measurement report sent by using the direct S-RRC message. Consequently, the SN cannot use the measurement result.

In view of this, the embodiments of this application provide the following RRC message transmission methods, to improve the uplink RRC message transmission reliability.

In a first method, uplink and downlink paths are the same. This method is applicable to a case in which an uplink RRC message for an SN that is sent by a terminal is a response message for a downlink RRC message of the SN. For example, an RRC connection reconfiguration complete message is a response message for an RRC connection reconfiguration message. In this case, the terminal sends the uplink RRC message on a same path as the downlink RRC message.

Figure 9:
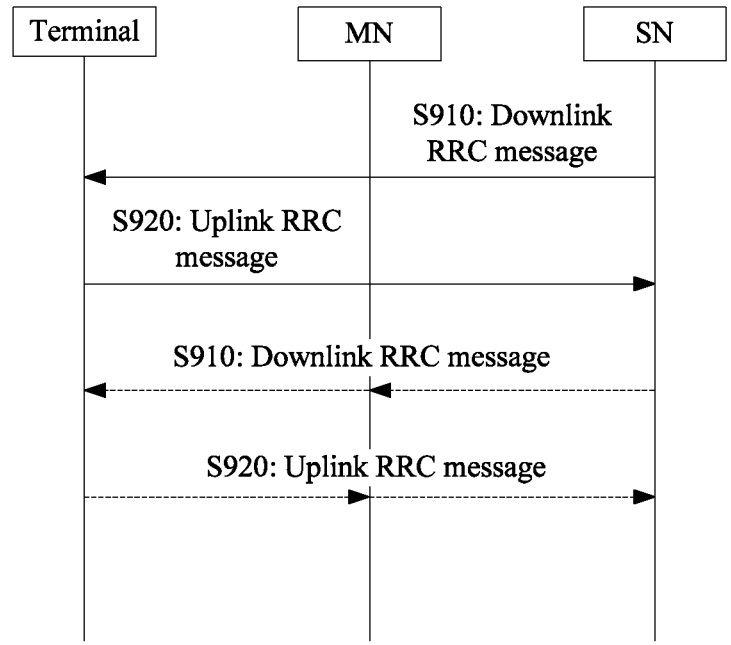
FIG. 9 is a schematic diagram of an RRC transmission method according to an embodiment of this application.

Referring to FIG. 9, FIG. 9 is a schematic diagram of an RRC transmission method according to an embodiment of this application. As shown in FIG. 9, the method is applied to a communications system, where the communications system includes an MN and an SN that jointly provide a service for a terminal, and the method includes the following steps:

S910: The terminal receives a downlink RRC message of the SN, where the downlink RRC message is received by the MN from the SN and sent to the terminal (a path shown by a dashed line in the figure), or the downlink RRC message is sent by the SN to the terminal (a path shown by a solid line in the figure).

S920: The terminal sends an uplink RRC message, where the uplink RRC message is a response message for the downlink RRC message, and a path on which the terminal sends the uplink RRC message is the same as a path on which the terminal receives the downlink RRC message. To be specific, when the downlink RRC message is received by the MN from the SN and sent to the terminal, the uplink RRC message is sent by the terminal to the MN and sent by the MN to the SN (a path shown by a dashed line in the figure). Alternatively, when the downlink RRC message is sent by the SN to the terminal, the uplink RRC message is sent by the terminal to the SN (a path shown by a solid line in the figure). The "sent" herein means being directly sent without being forwarded by the MN.

It can be learned that the terminal sends the uplink RRC message on a path consistent with a path on which the downlink RRC message of the SN is received. In this way, a problem of poor uplink RRC message reliability caused by sending on two paths is resolved.

In a second method, an MN or an SN configures an uplink RRC transmission path. This method may be applied to a case in which a terminal initiates an uplink RRC message, and may also be applied to a case in which an uplink RRC message for an SN that is sent by a terminal is a response message for a downlink RRC message of the SN.

Figure 10:
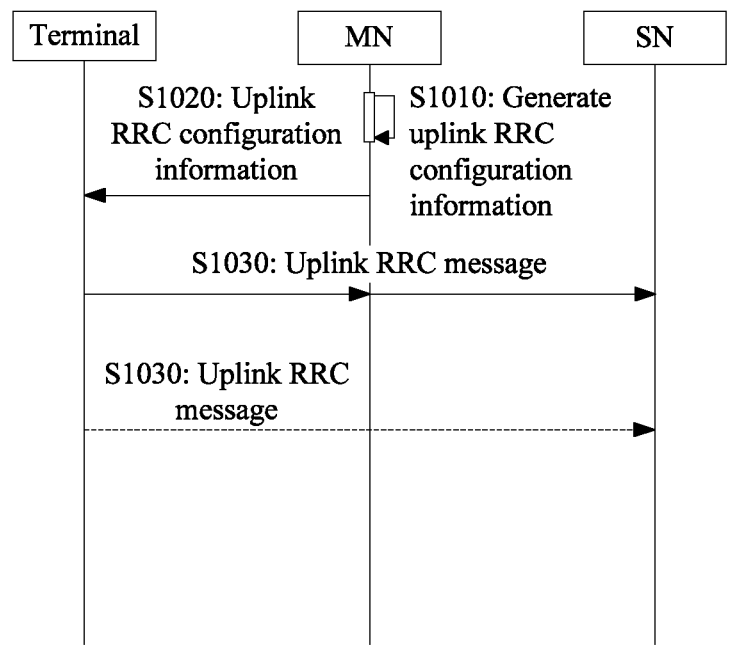
FIG. 10 is a schematic diagram of another RRC transmission method according to an embodiment of this application.

For example, an MN configures an uplink RRC transmission path. Referring to FIG. 10, FIG. 10 is a schematic diagram of another RRC transmission method according to an embodiment of this application. As shown in FIG. 10, the method is applied to a communications system, where the communications system includes an MN and an SN that jointly provide a service for a terminal, and the method includes the following steps.

S1010: The MN generates uplink RRC configuration information of the SN, where the uplink RRC configuration information is used to configure a manner in which the terminal sends an uplink RRC message for the SN.

S1020: The MN sends the uplink RRC configuration information to the terminal, so that the terminal sends the uplink RRC message based on the uplink RRC configuration information.

The terminal receives the uplink RRC configuration information, and performs the following step:

S1030: The terminal sends an uplink RRC message for the SN based on the uplink RRC configuration information.

The uplink RRC configuration information may be sent to the terminal in the process shown in FIG. 5 of establishing the SRB of the secondary node, or may be sent to the terminal after the process shown in FIG. 5 of establishing the SRB of the secondary node, that is, after the SRB of the secondary node is established, and the MN may add the uplink RRC configuration information to an RRC connection reconfiguration message.

Alternatively, an SN may configure an uplink RRC transmission path, that is, the sending manner of the uplink RRC message may be configured by the SN. In this case, step S1010 may be: obtaining, by the MN, uplink RRC configuration information of the SN. Optionally, the uplink RRC configuration information may be included in the foregoing configuration information for the SRB. In addition, possible configurations in the uplink RRC configuration information include:

1. A response message (or referred to as a reply message) for an RRC message sent by the SN is directly sent to the SN. That is, the terminal directly sends an uplink RRC message for the SN to the SN, where the uplink RRC message is a response message for a downlink RRC message of the SN.

2. A response message (or referred to as a reply message) for an RRC message sent by the SN is sent to the SN through the MN. That is, the terminal directly sends an uplink RRC message for the SN to the MN, and the MN sends the uplink RRC message for the SN to the SN, where the uplink RRC message is a response message for a downlink RRC message of the SN. In this case, the terminal sends, to the MN, an RRC message in a format of a standard to which the MN belongs, that is, an M-RRC message. The M-RRC message includes an RRC message that is returned by the terminal to the SN and that is in a format of a standard to which the SN belongs, that is, an embedded S-RRC message. For example, if the MN is an LTE eNB and the SN is an NR gNB, after the SN sends an NR RRC connection reconfiguration message to the UE, the terminal generates an NR RRC connection reconfiguration complete message after the configuration. The NR RRC connection reconfiguration complete message is sent to the MN by using an LTE RRC message, and then sent by the MN to the SN.

3. The terminal sends, based on a result of measuring a cell of the SN, an uplink RRC message for the SN to the SN directly or through the MN. For example, a measurement threshold is configured for the terminal. When a measurement value obtained by the terminal by measuring the cell of the SN is greater than the threshold, the terminal directly sends the uplink RRC message for the SN to the SN. Otherwise, the terminal adds the uplink RRC message for the SN to an RRC message sent to the MN, to send the uplink RRC message for the SN to the MN, and the MN sends the uplink RRC message for the SN to the SN.

4. It is configured that a first-type uplink RRC message for the SN is directly sent to the SN, and a second-type uplink RRC message for the SN is sent to the SN through the MN. The first-type and second-type uplink RRC messages of the SN may include more than one message type, and may be specifically configured based on a requirement, and are not limited herein.

5. A rule that uplink is subordinate to downlink is configured. If a downlink RRC message is received on the SRB of the SN, a corresponding uplink RRC message is also sent on the SRB of the SN, that is, the terminal sends the uplink RRC message for the SN on a same path as the downlink RRC message of the SN. Optionally, the uplink RRC message is a response message for the downlink RRC message, similar to that in the embodiment shown in FIG. 9. The embodiment shown in FIG. 9 may be implemented through agreement between the terminal and a network side without configuration by the MN, or may be implemented through configuration by the MN.

6. An uplink RRC message for the SN does not affect the MN by default, and is directly sent on the SRB of the SN, that is, the terminal directly sends the uplink RRC message for the SN to the SN. Alternatively, an uplink RRC message for the SN affects the MN by default, and is sent to the SN through the MN, that is, the terminal sends the uplink RRC message for the SN to the SN through the MN.

Regardless of uplink or downlink, in a scenario in which the MN sends an RRC message of the SN to the SN, a tunnel is established between the MN and the SN for transmitting an RRC message sent by the terminal to the SN. For example, an SCG SRB may be indicated in an SN addition request message, and an acknowledgment message returned by the SN to the MN carries a tunnel endpoint identifier (TEID) allocated to the SCG SRB.

It should be noted that the embodiment shown in FIG. 9 or FIG. 10 may be combined with the previous embodiment, to further improve uplink RRC message transmission reliability.

In an LTE-NR dual connectivity scenario in which LTE is used as an anchor, if an SN works at a high frequency, a beamforming technology may be used. A terminal may need to measure and report a beam in the SN, to select a proper beam for the terminal. Currently, both measurement configuration and measurement reporting of the terminal are performed at an MN. To be specific, the MN performs measurement configuration for the terminal, and the terminal performs measurement based on the measurement configuration, and sends a measurement report to the MN when a measurement event is met. Therefore, in the LTE-NR dual connectivity scenario, if the existing manner is still used, movement of the terminal between cells or beams of the SN needs to be controlled by the MN. When the MN determines to change a cell or beam, the MN notifies the terminal, and the MN further needs to notify the SN, to implement movement of the terminal in the SN.

It can be learned that a time required by an entire configuration process includes a time of air interface transmission between the MN of the LTE standard and the terminal and a time of interface interaction between the MN and the SN. Compared with a case in which configuration and interaction are directly implemented between the SN and the terminal, the existing mechanism has a longer latency. In a high-frequency movement scenario, it is possible that the existing mechanism cannot meet a low-latency requirement. In the foregoing embodiments, an RRC message may be directly transmitted between the terminal and the SN, that is, the SN may establish an SRB for communication with the terminal. In this case, the MN may configure only LTE measurement for the terminal, and NR measurement is configured by the SN. If the MN and the SN both configure NR measurement for the terminal, a problem such as inconsistent configuration may be caused. The MN may also learn of information about a surrounding NR cell, to implement switching or SCG management. To further improve mobility management efficiency, in an embodiment of this application, an MN sends measurement configuration information to an SN, where the measurement configuration information is used to configure a condition for triggering the SN to send, to the MN, a result of measuring a cell of the SN by a terminal. For example, the measurement configuration information is a threshold. When a measurement result in a measurement report received by the SN is greater than or equal to the threshold, the SN sends the measurement result to the MN, so that the MN performs mobility management, for example, makes a switching decision or performs SCG management.

Figure 11:
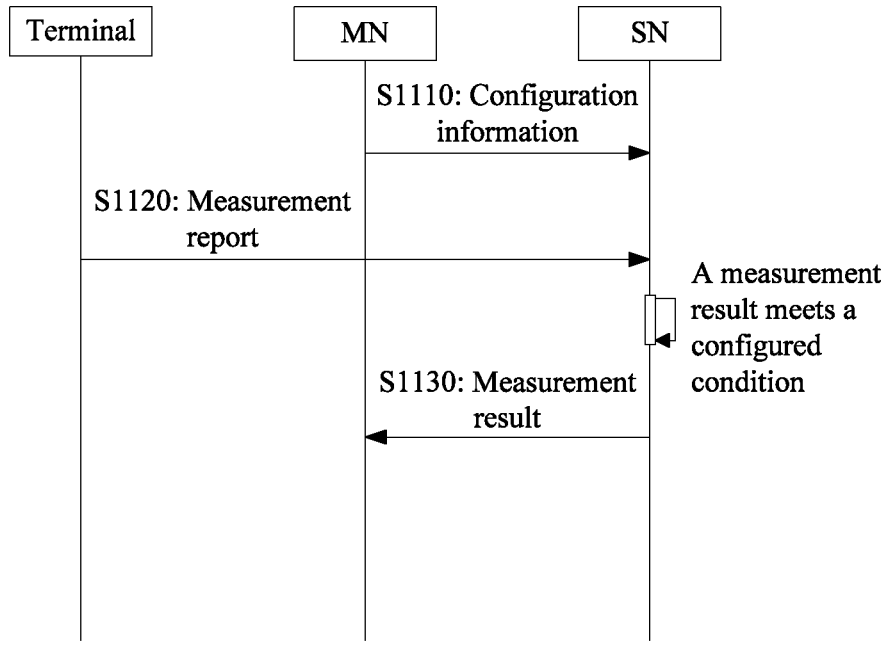
FIG. 11 is a schematic diagram of a configuration method according to an embodiment of this application.

Referring to FIG. 11, FIG. 11 is a schematic diagram of a configuration method according to an embodiment of this application. As shown in FIG. 11, the method is applied to a communications system, where the communications system includes an MN and an SN that jointly provide a service for a terminal, measurement of a cell of the MN by the terminal is configured by the MN, measurement of a cell of the SN by the terminal is configured by the SN, and the method includes the following steps:

S1110: The MN sends measurement configuration information to the SN, where the measurement configuration information is used to configure a condition for triggering the SN to send a measurement result to the MN.

S1120: The SN receives a measurement report that is obtained by measuring a cell of the SN and that is sent by the terminal.

S1130: When the measurement report includes a measurement result meeting the foregoing condition, the SN sends the measurement result to the MN.

Certainly, the SN may send all measurement results in all measurement reports to the MN, or may send only a measurement result meeting the condition. This is not limited herein.

The measurement configuration information may include a threshold. When a measurement result in a measurement report obtained by the SN is greater than or equal to the threshold, the SN sends the measurement result to the MN. That is, step S1110 may be: sending, by the MN, a threshold to the SN. Step S1130 may be: when a measurement result in the measurement report is greater than or equal to the threshold, sending, by the SN, the measurement result to the MN. Optionally, the SN may send all measurement results to the MN, or may send some measurement results to the MN. For example, a measurement value greater than or equal to the threshold is sent to the MN. In addition, information sent by the SN may further include a cell/beam identifier corresponding to the sent measurement result.

In addition, the SN may also configure the threshold for the terminal as a measurement threshold. Alternatively, the SN may configure, for the terminal, another measurement threshold different from the threshold. That is, the SN may configure a measurement event for the terminal with reference to the threshold. For example, the SN may configure, for the terminal as a threshold of the measurement event, the threshold obtained from the MN. Alternatively, the SN may configure a measurement threshold for the terminal by itself, without reference to the threshold.

For example, the MN is an LTE eNB, and the SN is an NR gNB. After initial configuration is completed, only LTE measurement is implemented between the MN and the terminal, and NR measurement configuration and reporting are performed between the SN and the terminal. To enable the MN to learn of NR measurement to implement mobility management (for example, MN switching or SN switching), the MN may obtain a required measurement result from the SN. For example, the MN may configure a threshold for the SN. The threshold may be a reference signal received power (RSRP) threshold, a reference signal received quality (RSRQ) threshold, or the like. The threshold may be carried in an SN addition/modification request message and sent to the SN. The SN receives a measurement report reported by the terminal. The measurement report includes a result of measuring an NR cell and/or beam, for example, includes a measurement value such as RSRP or RSRQ of the NR cell or beam. When a result of measuring an NR cell or beam exceeds the threshold configured by the MN, the SN sends measurement information to the MN. The measurement information includes an identifier and a measurement result of at least one NR cell/beam.

It should be noted that this embodiment may be combined with the previous embodiment, to further improve terminal mobility management efficiency.

Figure 12:
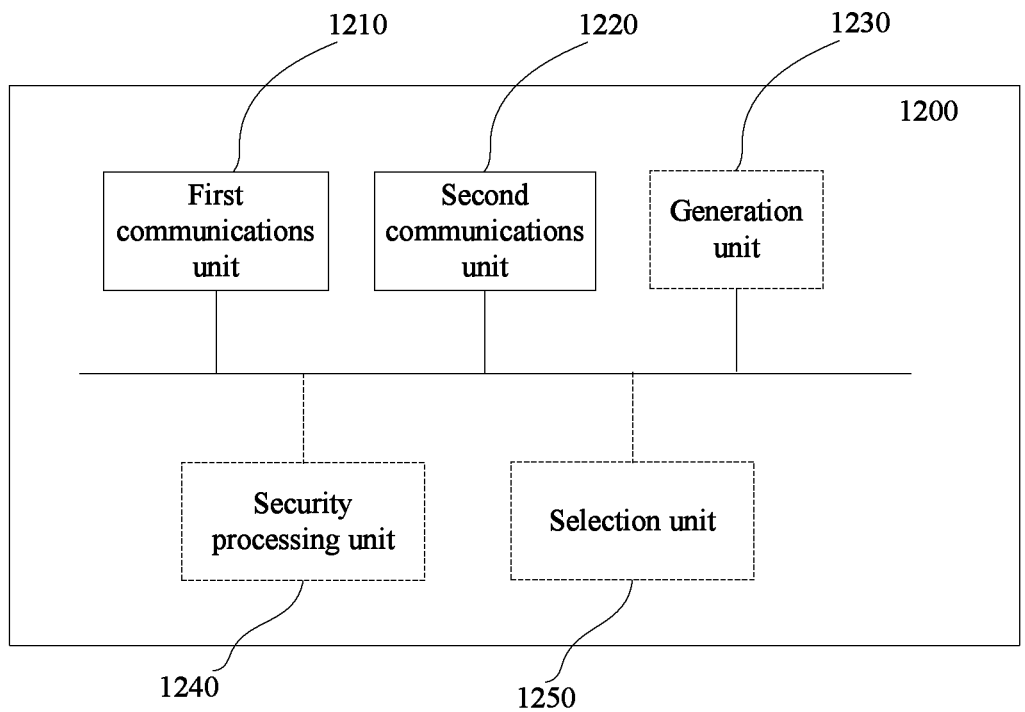
FIG. 12 is a schematic diagram of an apparatus applied to an SN according to an embodiment of this application.

Referring to FIG. 12, FIG. 12 is a schematic diagram of an apparatus according to an embodiment of this application. The apparatus 1200 is applied to an SN in a communications system. The communications system includes an MN and the SN that jointly provide a service for a terminal. As shown in FIG. 12, the apparatus 1200 includes units or means for performing steps performed by an SN in any method embodiment of the foregoing method, and all detailed descriptions about these steps are applicable to this apparatus embodiment. For example, the apparatus 1200 includes a first communications unit 1210 and a second communications unit 1220. The first communications unit 1210 is configured to control communication between the SN and the MN, and may include a first receiving unit and a first sending unit that are respectively configured to control receiving and sending. The first communications unit 1210 may receive and send messages through an interface (for example, an X2 interface, which may also be referred to as an Xn interface) between the SN and the MN. The second communications unit 1220 is configured to control communication between the SN and the terminal, and may include a second receiving unit and a second sending unit that are respectively configured to control receiving and sending. The second communications unit 1220 may receive and send messages through an interface (for example, an air interface) between the SN and the terminal. The interface herein is a logical concept, and a corresponding logical unit needs to be set during implementation, to meet a protocol requirement of a corresponding interface. A physical connection between nodes may be a wireless connection, or may be a wired connection. For example, a wireless connection manner may be used for a RAN node (the MN or the SN) and the terminal, and a wired connection manner may be used for the SN and the MN.

In the foregoing method embodiments, all messages or information received by the SN from the MN may be received under control of the first communications unit 1210, and all messages or information sent by the SN to the MN may be sent under control of the first communications unit 1210. All messages or information received by the SN from the terminal may be received under control of the second communications unit 1220, and all messages or information sent by the SN to the terminal may be sent under control of the second communications unit 1220.

For example, the foregoing apparatus 1200 may be a configuration apparatus, and further include a generation unit 1230, configured to generate configuration information for an SRB, where the SRB is used to transmit an RRC message between the SN and the terminal. The first communications unit 1210 is configured to send the configuration information for the SRB to the MN, so that the configuration information for the SRB is sent to the terminal through the MN. When the terminal sends a configuration result to the SN through the MN, the first communications unit 1210 is configured to receive a result of configuring the SRB by the terminal by using the configuration information for the SRB. When the terminal directly sends a configuration result to the SN, the second communications unit 1220 is configured to receive a result of configuring the SRB by the terminal by using the configuration information for the SRB.

For descriptions about cases in which the generation unit 1230 generates the configuration information for the SRB, and forms and content of the configuration information for the SRB, refer to the foregoing embodiments, and details are not described herein again. In addition, for details about other sent or received messages or information, refer to the foregoing method embodiments, and details are not described herein again. Moreover, for content or forms of the sent or received messages or information, also refer to the foregoing method embodiments.

Optionally, the first communications unit 1210 is further configured to receive security information used for the SRB of the SN from the MN. In this case, the apparatus 1200 may further include a security processing unit 1240, configured to: before the configuration information for the SRB is sent to the MN, perform security processing on the configuration information for the SRB of the SN by using the security information.

Optionally, the first communications unit 1210 is further configured to receive a key group from the master node. In this case, the apparatus 1200 may further include a selection unit 1250, configured to select a key from the key group when the SN updates a key.

For another example, the foregoing apparatus 1200 may be another configuration apparatus. The first communications unit 1210 is configured to receive measurement configuration information from the MN, where the measurement configuration information is used to configure a condition for triggering the SN to send a measurement result to the MN. The second communications unit 1220 is configured to receive, from the terminal, a measurement report obtained by the terminal by measuring a cell of the SN. When the measurement report includes a measurement result meeting the foregoing condition, the first communications unit 1210 is configured to send the measurement result to the MN.

It should be understood that division of the units of the foregoing apparatus is merely division of logical functions. During actual implementation, all or some of the units may be integrated into a physical entity, or may be physically separated. Moreover, these units may be all implemented in a form of software invoked by a processing element, or may be all implemented by hardware, or some units may be implemented in a form of software invoked by a processing element, and some units may be implemented by hardware. For example, during implementation, the first communications unit 1210 may be a separately disposed processing element, or may be integrated into a chip of the SN. Alternatively, the first communications unit 1210 may be stored in a memory of the SN as a program and invoked by a processing element of the SN to perform a function of the unit. Implementation of other units is similar thereto. In addition, all or some of these units may be integrated or separately implemented. The processing element herein may be an integrated circuit having a signal processing capability. In an implementation process, the steps of the foregoing method or the foregoing units may be completed by using a hardware-integrated logic circuit in a processor element or instructions in a form of software. In addition, the foregoing first communications unit is a communication control unit, and may receive information sent by the MN or send information to the MN through a connection medium, for example, an optical fiber, between the SN and the MN. The foregoing second communications unit is a communication control unit, and may receive information sent by the terminal or send information to the terminal through a receive apparatus, for example, an antenna and a radio frequency apparatus, of the SN.

For example, the foregoing units may be configured as one or more integrated circuits for implementing the foregoing method, for example, one or more application-specific integrated circuits (ASIC), or one or more microprocessors (digital signal processor, DSP), or one or more field-programmable gate arrays (FPGA). For another example, when a unit above is implemented in a form of a program scheduled by a processing element, the processing element may be a general-purpose processor, for example, a central processing unit (CPU) or another processor that can invoke a program. For another example, these units may be integrated, and implemented in a system-on-a-chip (SOC) form.

Figure 13:
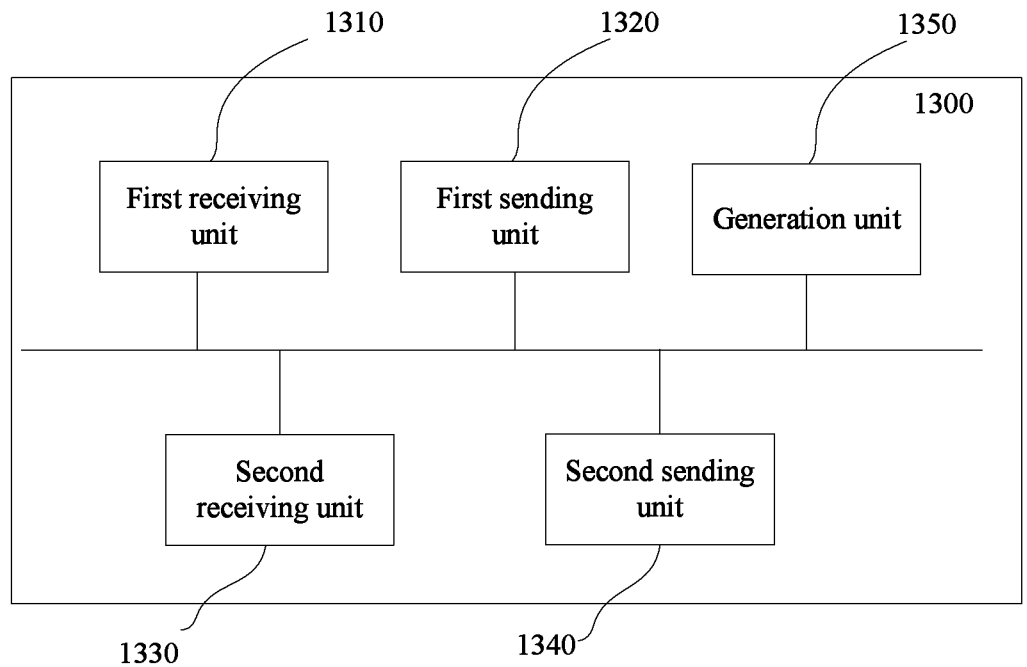
FIG. 13 is a schematic diagram of an apparatus applied to an MN according to an embodiment of this application.

Referring to FIG. 13, FIG. 13 is a schematic diagram of an apparatus according to an embodiment of this application. The apparatus 1300 is applied to an MN in a communications system. The communications system includes the MN and an SN that jointly provide a service for a terminal. As shown in FIG. 13, the apparatus 1300 includes units or means for performing steps performed by an MN in any method embodiment of the foregoing method, and all detailed descriptions about these steps are applicable to this apparatus embodiment. The apparatus 1300 includes a first receiving unit 1310, a first sending unit 1320, a second receiving unit 1330, and a second sending unit 1340. The first receiving unit 1310 and the first sending unit 1320 may be referred to as a first communications unit, configured to control communication between the MN and the SN; and may receive and send messages through an interface (for example, an X2 interface, which may also be referred to as an Xn interface) between the MN and the SN. The second receiving unit 1330 and the second sending unit 1340 may be referred to as a second communications unit, configured to control communication between the MN and the terminal; and may receive and send messages through an interface (for example, an air interface) between the MN and the terminal. The interface herein is a logical concept, and a corresponding logical unit needs to be set during implementation, to meet a protocol requirement of a corresponding interface. A physical connection between nodes may be a wireless connection, or may be a wired connection. For example, a wireless connection manner may be used for a RAN node (the MN or the SN) and the terminal, and a wired connection manner may be used for the MN and the SN.

In the foregoing method embodiments, all messages or information received by the MN from the SN may be received under control of the first receiving unit 1310, and all messages or information sent by the MN to the SN may be sent under control of the first sending unit 1320. All messages or information received by the MN from the terminal may be received under control of the second receiving unit 1330, and all messages or information sent by the MN to the terminal may be sent under control of the second sending unit 1340.

For example, the first receiving unit 1310 is configured to receive configuration information for an SRB from the SN, where the SRB is used to transmit an RRC message between the SN and the terminal. The "transmit" herein means directly transmitting without forwarding by the MN. The second sending unit 1340 is configured to send the configuration information for the SRB to the terminal. The second receiving unit 1330 is configured to receive a result of configuring the SRB by the terminal by using the configuration information for the SRB. The first sending unit 1320 is configured to send the configuration result to the SN. For details about other sent or received messages or information, refer to the foregoing method embodiments, and details are not described herein again. Moreover, for content or forms of the sent or received messages or information, also refer to the foregoing method embodiments.

For another example, the foregoing apparatus is an RRC message transmission apparatus, and further includes a generation unit 1350, configured to generate uplink RRC configuration information of the SN, or the first receiving unit 1310 is configured to receive uplink RRC configuration information from the SN. The uplink RRC configuration information is used to configure a manner in which the terminal sends an uplink RRC message for the SN. The second sending unit 1340 is configured to send the uplink RRC configuration information to the terminal, so that the terminal sends the uplink RRC message based on the uplink RRC configuration information. The sending manner is the same as that in the foregoing embodiments, and details are not described herein again.

For another example, the foregoing apparatus is a configuration apparatus. The first sending unit 1320 is configured to send measurement configuration information to the SN, where the measurement configuration information is used to configure a condition for triggering the SN to send a measurement result to the MN. The first receiving unit 1310 receives a measurement result meeting the foregoing condition from the SN, where the measurement result is obtained by the terminal by measuring a cell of the SN and reported to the SN.

It should be understood that division of the units of the foregoing apparatus is merely division of logical functions. During actual implementation, all or some of the units may be integrated into a physical entity, or may be physically separated. Moreover, these units may be all implemented in a form of software invoked by a processing element, or may be all implemented by hardware, or some units may be implemented in a form of software invoked by a processing element, and some units may be implemented by hardware. For example, during implementation, the first receiving unit 1310 may be a separately disposed processing element, or may be integrated into a chip of the MN. Alternatively, the first receiving unit 1310 may be stored in a memory of the MN as a program and invoked by a processing element of the MN to perform a function of the unit. Implementation of other units is similar thereto. In addition, all or some of these units may be integrated or separately implemented. The processing element herein may be an integrated circuit having a signal processing capability. In an implementation process, the steps of the foregoing method or the foregoing units may be completed by using a hardware-integrated logic circuit in a processor element or instructions in a form of software. In addition, the foregoing first receiving unit is a receiving control unit and may receive, through a receive apparatus, for example, an antenna and a radio frequency apparatus, of the MN, information sent by the terminal. The foregoing first sending unit is a sending control unit and may send information to the terminal through a transmit apparatus, for example, an antenna and a radio frequency apparatus, of the MN. The foregoing second receiving unit is a receiving control unit and may receive, through a connection medium, for example, an optical fiber, between the MN and the SN, information sent by the SN. The foregoing second sending unit is a sending control unit and may send information to the SN through a connection medium, for example, an optical fiber, between the MN and the SN.

For example, the foregoing units may be configured as one or more integrated circuits for implementing the foregoing method, for example, one or more application-specific integrated circuits (ASIC), or one or more microprocessors (digital signal processor, DSP), or one or more field-programmable gate arrays (FPGA). For another example, when a unit above is implemented in a form of a program scheduled by a processing element, the processing element may be a general-purpose processor, for example, a central processing unit (CPU) or another processor that can invoke a program. For another example, these units may be integrated, and implemented in a system-on-a-chip (SOC) form.

Figure 14:
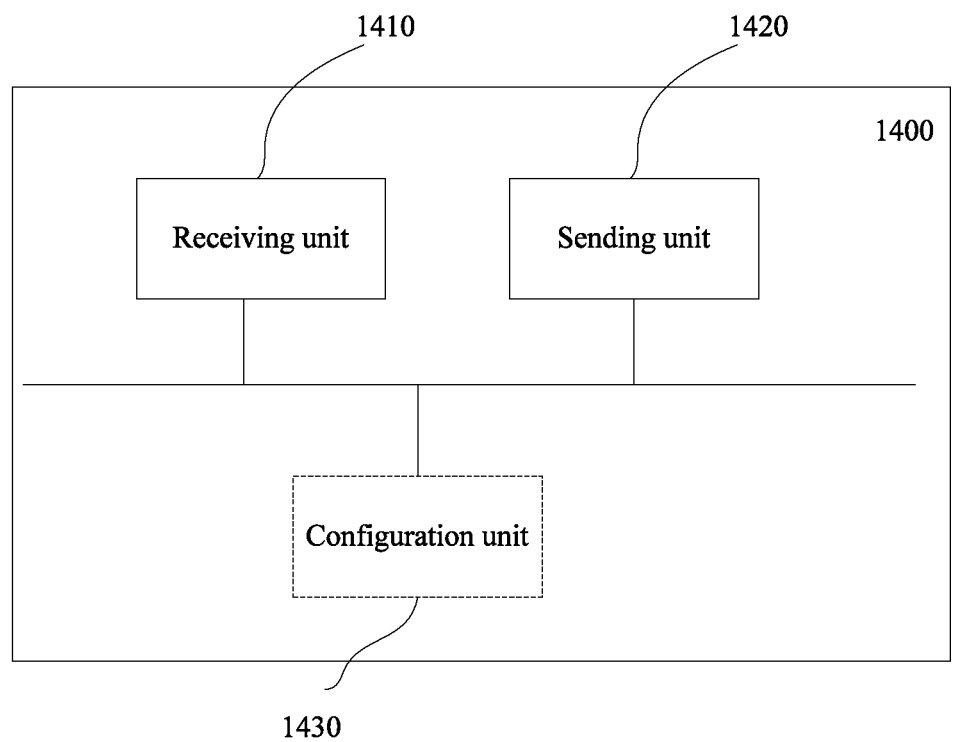
FIG. 14 is a schematic diagram of an apparatus applied to a terminal according to an embodiment of this application.

Referring to FIG. 14, FIG. 14 is a schematic diagram of an apparatus according to an embodiment of this application. The apparatus 1400 is applied to a terminal in a communications system. The communications system includes an MN and an SN that jointly provide a service for the terminal. As shown in FIG. 14, the apparatus 1400 includes units or means for performing steps performed by a terminal in any method embodiment of the foregoing method, and all detailed descriptions about these steps are applicable to this apparatus embodiment. The apparatus includes a receiving unit 1410 and a sending unit 1420. The receiving unit 1410 and the sending unit 1420 are configured to control communication with a RAN node (for example, the MN or the SN), and may receive and send messages through an interface (for example, an air interface) between the terminal and the RAN node. The interface herein is a logical concept, and a corresponding logical unit needs to be set during implementation, to meet a protocol requirement of a corresponding interface. A physical connection between nodes may be a wireless connection.

In the foregoing method embodiments, all messages or information received by the terminal from the MN or the SN may be received under control of the receiving unit 1410, and all messages or information sent by the terminal to the MN or the SN may be sent under control of the sending unit 1420.

For example, the foregoing apparatus 1400 is a configuration apparatus, and further includes a configuration unit 1430. The receiving unit 1410 is configured to receive configuration information for an SRB of the SN from the MN, where the SRB is used to transmit an RRC message between the SN and the terminal. The "transmit" herein means directly transmitting without forwarding by the MN. The configuration unit 1430 is configured to configure the SRB by using the configuration information for the SRB. The sending unit 1420 is configured to send a result of configuring the SRB. For details about other sent or received messages or information, refer to the foregoing method embodiments, and details are not described herein again. Moreover, for content or forms of the sent or received messages or information, also refer to the foregoing method embodiments.

In addition, the configuration unit 1430 may be further configured to perform other RRC configuration. For example, after SRB configuration is completed, the receiving unit 1410 may receive an RRC connection reconfiguration message from the SN. In this case, the configuration unit 1430 may perform reconfiguration corresponding to the RRC connection reconfiguration message. Moreover, when reconfiguration fails, the configuration unit 1430 may restore configuration before the RRC connection reconfiguration message is received.

For another example, the foregoing apparatus is an RRC message transmission apparatus. The receiving unit 1410 is configured to receive a downlink RRC message of the SN, where the downlink RRC message is received by the MN from the SN and sent to the terminal, or the downlink RRC message is sent by the SN to the terminal. The sending unit 1420 is configured to send an uplink RRC message, where the uplink RRC message is a response message for the downlink RRC message, and a path on which the sending unit 1420 sends the uplink RRC message is the same as a path on which the receiving unit 1410 receives the downlink RRC message. That is, when the downlink RRC message is received by the MN from the SN and sent to the terminal, the uplink RRC message is sent by the terminal to the MN and sent by the MN to the SN. Alternatively, when the downlink RRC message is sent by the SN to the terminal, the uplink RRC message is sent by the terminal to the SN.

For another example, the foregoing apparatus is an RRC message transmission apparatus. The receiving unit 1410 is configured to receive uplink RRC configuration information of the SN from the MN, where the uplink RRC configuration information is used to configure a manner in which the terminal sends an uplink RRC message for the SN. The sending unit 1420 is configured to send the uplink RRC message for the SN based on the uplink RRC configuration information. The sending manner is the same as that in the foregoing embodiments, and details are not described herein again.

It should be understood that division of the units of the foregoing apparatus is merely division of logical functions. During actual implementation, all or some of the units may be integrated into a physical entity, or may be physically separated. Moreover, these units may be all implemented in a form of software invoked by a processing element, or may be all implemented by hardware, or some units may be implemented in a form of software invoked by a processing element, and some units may be implemented by hardware. For example, during implementation, the receiving unit 1410 may be a separately disposed processing element, or may be integrated into a chip of the terminal. Alternatively, the receiving unit 1410 may be stored in a memory of the terminal as a program and invoked by a processing element of the terminal to perform a function of the unit. Implementation of other units is similar thereto. In addition, all or some of these units may be integrated or separately implemented. The processing element herein may be an integrated circuit having a signal processing capability. In an implementation process, the steps of the foregoing method or the foregoing units may be completed by using a hardware-integrated logic circuit in a processor element or instructions in a form of software. In addition, the receiving unit is a receiving control unit and may receive, through a receive apparatus, for example, an antenna and a radio frequency apparatus, of the terminal, information sent by the MN or the SN. The sending unit is a sending control unit and may send information to the MN or the SN through a transmit apparatus, for example, an antenna and a radio frequency apparatus, of the terminal.

For example, the foregoing units may be configured as one or more integrated circuits for implementing the foregoing method, for example, one or more application-specific integrated circuits (ASIC), or one or more microprocessors (digital signal processor, DSP), or one or more field-programmable gate arrays (FPGA). For another example, when a unit above is implemented in a form of a program scheduled by a processing element, the processing element may be a general-purpose processor, for example, a central processing unit CPU) or another processor that can invoke a program. For another example, these units may be integrated, and implemented in a system-on-a-chip (SOC) form.

Figure 15:
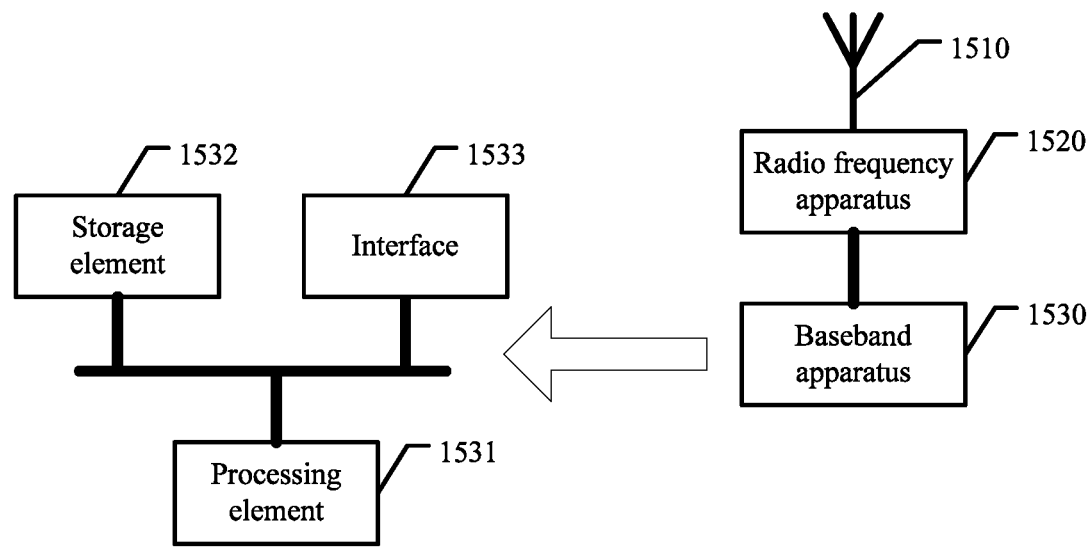
FIG. 15 is a schematic structural diagram of a RAN node according to an embodiment of this application.

Referring to FIG. 15, FIG. 15 is a schematic structural diagram of a RAN node according to an embodiment of this application. The RAN node may be the SN or the MN in the foregoing embodiment, configured to implement operations of the SN or the MN in the foregoing embodiment. As shown in FIG. 15, the RAN node includes: an antenna 1510, a radio frequency apparatus 1520, and a baseband apparatus 1530. The antenna 1510 is connected to the radio frequency apparatus 1520. In an uplink direction, the radio frequency apparatus 1520 receives, through the antenna 1510, information sent by a terminal, and sends the information sent by the terminal to the baseband apparatus 1530 for processing. In a downlink direction, the baseband apparatus 1530 processes information of the terminal, and sends the information of the terminal to the radio frequency apparatus 1520, and the radio frequency apparatus 1520 processes the information of the terminal, and then sends the information of the terminal to the terminal through the antenna 1510. Communication between RAN nodes, for example, between an MN and an SN, may be performed through a transmission medium. The transmission medium may be a wired medium, for example, an optical fiber; or may be a wireless medium.

The foregoing configuration apparatus applied to the SN or the MN may be located in the baseband apparatus 1530. In an implementation, the units shown in FIG. 12 or FIG. 13 are implemented in a form of a program scheduled by a processing element. For example, the baseband apparatus 1530 includes a processing element 1531 and a storage element 1532. The processing element 1531 invokes a program stored in the storage element 1532, to perform a method performed by the SN or the MN in the foregoing method embodiments. In addition, the baseband apparatus 1530 may further include an interface 1533, configured to exchange information with the radio frequency apparatus 1520. The interface is, for example, a common public radio interface (CPRI).

In another implementation, the units shown in FIG. 12 or FIG. 13 may be configured as one or more processing elements for implementing a method performed by the SN or the MN. These processing elements are disposed on the baseband apparatus 1530. The processing elements herein may be an integrated circuit, for example, one or more ASICs, or one or more DSPs, or one or more FPGAs. These integrated circuits may be integrated to form a chip.

For example, the units shown in FIG. 12 or FIG. 13 may be integrated, and implemented in a system-on-a-chip (SOC) form. For example, the baseband apparatus 1530 includes an SOC chip, configured to implement the foregoing method. The chip may be integrated with the processing element 1531 and the storage element 1532, and the processing element 1531 invokes a program stored in the storage element 1532 to implement the foregoing method performed by the SN or the MN or functions of the units shown in FIG. 12 or FIG. 13. Alternatively, the chip may be integrated with at least one integrated circuit, to implement the method performed by the SN or the MN or functions of the units shown in FIG. 12 or FIG. 13. Alternatively, the foregoing implementations may be combined, where functions of some units are implemented by the processing element by invoking a program, and functions of some units are implemented by an integrated circuit.

Regardless of the manners used, the foregoing configuration apparatus applied to the SN or the MN includes at least one processing element and a storage element, where the at least one processing element is configured to perform the method that is performed by the SN or the MN and provided in the foregoing method embodiments. The processing element may perform, in a first manner, that is, by running a program stored in the storage element, some or all steps performed by the SN or the MN in the foregoing method embodiments; or may perform, in a second manner, that is, by using a hardware-integrated logic circuit in a processor element and instructions, some or all steps performed by the SN or the MN in the foregoing method embodiments; or certainly, may perform, by combining the first manner and the second manner, the method performed by the SN or the MN in the foregoing method embodiments.

The processing element herein is the same as that in the foregoing description, and may be a general-purpose processor, for example, a central processing unit CPU), or may be configured as one or more integrated circuits for implementing the foregoing method, for example, one or more application-specific integrated circuits (ASIC), or one or more microprocessors (digital signal processor, DSP), or one or more field-programmable gate arrays (FPGA).

The storage element may be a memory, or may be a collective name for a plurality of storage elements.

Figure 16:
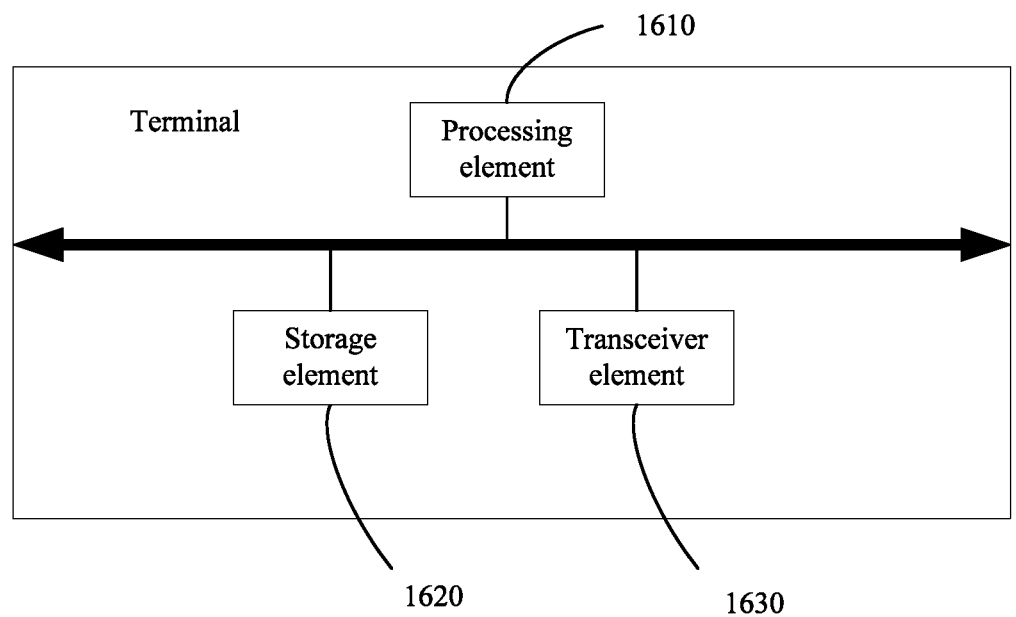
FIG. 16 is a schematic structural diagram of a terminal according to an embodiment of this application.

Referring to FIG. 16, FIG. 16 is a schematic structural diagram of a terminal according to an embodiment of this application. The terminal may be the terminal in the foregoing embodiment, configured to implement operations of the terminal in the foregoing embodiment. As shown in FIG. 16, the terminal includes: a processing element 1610, a storage element 1620, and a transceiver element 1630. The transceiver element 1630 may be connected to an antenna. In a downlink direction, the transceiver element 1630 receives, through the antenna, information sent by a base station, and sends the information to the processing element 1610 for processing. In an uplink direction, the processing element 1610 processes data of the terminal, and sends the data of the terminal to the base station through the transceiver element 1630.

The storage element 1620 is configured to store a program for implementing the foregoing method embodiment. The processing element 1610 invokes the program, to perform an operation in the foregoing method embodiment.

In another implementation, the units shown in FIG. 14 may be configured as one or more processing elements for implementing a method performed by the foregoing terminal. These processing elements are disposed on a circuit board of the terminal. The processing elements herein may be an integrated circuit, for example, one or more ASICs, or one or more DSPs, or one or more FPGAs. These integrated circuits may be integrated to form a chip.

For example, the units shown in FIG. 14 may be integrated, and implemented in a system-on-a-chip (SOC) form. For example, the terminal includes an SOC chip, configured to implement the foregoing method. The chip may be integrated with the processing element 1610 and the storage element 1620, and the processing element 1610 invokes the program stored in the storage element 1620 to implement the foregoing method or functions of the units shown in FIG. 14. Alternatively, the chip may be integrated with at least one integrated circuit, to implement the foregoing method or functions of the units shown in FIG. 14. Alternatively, the foregoing implementations may be combined, where functions of some units are implemented by the processing element by invoking a program, and functions of some units are implemented by an integrated circuit.

Regardless of the manners used, the foregoing configuration apparatus includes at least one processing element and a storage element, where the at least one processing element is configured to perform the method provided in the foregoing method embodiments. The processing element may perform, in a first manner, that is, by running a program stored in the storage element, some or all steps in the foregoing method embodiments; or may perform, in a second manner, that is, by using a hardware-integrated logic circuit in a processor element and instructions, some or all steps in the foregoing method embodiments; or certainly, may perform, by combining the first manner and the second manner, the method provided in the foregoing method embodiments.

The processing element herein is the same as that in the foregoing description, and may be a general-purpose processing element, for example, a central processing unit (CPU), or may be configured as one or more integrated circuits for implementing the foregoing method, for example, one or more application-specific integrated circuits (ASIC), or one or more microprocessors (digital signal processor, DSP), or one or more field-programmable gate arrays (FPGA).

The storage element may be a memory, or may be a collective name for a plurality of storage elements.

A person of ordinary skill in the art may understand that all or some of the steps of the method embodiments may be implemented by a program instructing relevant hardware. The program may be stored in a computer readable storage medium. When the program is run, the steps of the method embodiments are performed. The storage medium includes: various media that can store program code, such as a ROM, a RAM, a magnetic disk, or an optical disc.

What is claimed is:

1. A configuration method, applied to a communications system, wherein the communications system comprises a master node and a secondary node that jointly provide a service for a terminal, and the configuration method comprises:

generating, by the secondary node, configuration information for a signaling radio bearer (SRB), wherein the SRB is used to transmit a radio resource control (RRC) message between the secondary node and the terminal;

sending, by the secondary node, the configuration information for the SRB to the master node;

receiving, by the master node, the configuration information for the SRB from the secondary node;

sending, by the master node, the configuration information for the SRB to the terminal;

receiving, by the master node, a first response message from the terminal, wherein the first response message is comprised in an RRC connection reconfiguration response message sent from the terminal to the master node, the first response message indicating that the SRB is successfully established by using the configuration information for the SRB;

sending, by the master node, the first response message to the secondary node; and after the SRB is established, sending, by the secondary node, a downlink RRC message of the secondary node on a first path to the terminal; and receiving, by the secondary node, an uplink RRC message on a second path from the terminal, wherein the uplink RRC message is a response message for the downlink RRC message, and wherein when the first path is that the downlink RRC message is sent to the terminal by the secondary node via the master node, the second path is that the uplink RRC message is received by the secondary node via the master node; and when the first path is that the downlink RRC message is sent to terminal by the secondary node directly, the second path is that the uplink RRC message is received by the secondary node directly.

2. The configuration method according to claim 1, wherein the generating, by the secondary node, configuration information for an SRB comprises:

generating, by the secondary node, the configuration information for the SRB when the secondary node receives an addition request message from the master node, wherein the addition request message is used to request to add a secondary node.

3. The configuration method according to claim 1, wherein the configuration information for the SRB comprises: an SRB identifier, a radio link control (RLC) layer configuration of the SRB, a logical channel configuration, and an SRB security parameter.

4. The configuration method according to claim 1, wherein before the generating, by the secondary node, configuration information for an SRB, the configuration method further comprises:

receiving, by the secondary node, security information used for the SRB of the secondary node from the master node, wherein the security information comprises at least one of a security key or information about a security algorithm.

5. The configuration method according to claim 1, further comprising:

sending, by the master node, measurement configuration information to the secondary node, receiving, by the secondary node, the measurement configuration information from the master node, wherein the measurement configuration information is used to configure a condition for triggering the secondary node to send a measurement result to the master node; and sending, by the secondary node, a measurement result meeting the condition to the master node.

6. The configuration method according to claim 1, the sending, by the secondary node, the configuration information for the SRB to the master node comprises:

sending, by the secondary node, the configuration information for the SRB to the master node as an RRC container.

7. The configuration method according to claim 1, further comprising:

sending, by the secondary node, an RRC connection reconfiguration message to the terminal;

sending, by the master node, a configuration failure notification to the secondary node when configuration of the RRC connection reconfiguration message fails; and receiving, by the secondary node, the configuration failure notification from the master node.

8. An apparatus, the apparatus comprising at least one processor and one or more memories coupled to the at least one processor, the one or more memories storing instructions for execution by the at least one processor to:

generate configuration information for a signaling radio bearer (SRB) wherein the SRB is used to transmit a radio resource control (RRC) message between a secondary node and a terminal;

send the configuration information for the SRB to a master node, wherein the configuration information for the SRB is sent to the terminal through the master node;

receive by the secondary node, a first response message from the master node, wherein the first response message is comprised in an RRC connection reconfiguration response message sent from the terminal to the master node, the first response message indicating that the SRB is successfully established by using the configuration information for the SRB; and after the SRB is established, send a downlink RRC message of the secondary node on a first path to the terminal; and receive an uplink RRC message on a second path from the terminal, wherein the uplink RRC message is a response message for the downlink RRC message, and wherein when the first path is that the downlink RRC message is sent to the terminal by the secondary node via the master node, the second path is that the uplink RRC message is received by the secondary node via the master node; and when the first path is that the downlink RRC message is sent to terminal by the secondary node directly, the second path is that the uplink RRC message is received by the secondary node directly.

9. The apparatus according to claim 8, wherein the generating configuration information for the SRB comprises:

generating the configuration information for the SRB when the secondary node receives an addition request message from the master node, wherein the addition request message is used to request to add a secondary node.

10. The apparatus according to claim 8, wherein the one or more memories store the instructions for execution by the at least one processor to:

receive security information used for the SRB of the secondary node from the master node, wherein the security information comprises at least one of a security key or information about a security algorithm.

11. The apparatus according to claim 8, wherein the one or more memories store the instructions for execution by the at least one processor to:

receive measurement configuration information from the master node, wherein the measurement configuration information is used to configure a condition for triggering the secondary node to send a measurement result to the master node; and send a measurement result meeting the condition to the master node.

12. The apparatus according to claim 8, wherein the sending the configuration information for the SRB to the master node comprises:

sending the configuration information for the SRB to the master node as an RRC container.

13. The apparatus according to claim 8, wherein the one or more memories store the instructions for execution by the at least one processor to:

send an RRC connection reconfiguration message to the terminal; and receive a configuration failure notification from the master node when configuration of the RRC connection reconfiguration message fails.

14. An apparatus, the apparatus comprising at least one processor and one or more memories coupled to the at least one processor, the one or more memories storing instructions for execution by the at least one processor to:

receive configuration information for a signaling radio bearer (SRB) from a secondary node, wherein the SRB is used to transmit a radio resource control (RRC) message between the secondary node and a terminal;

send the configuration information for the SRB to the terminal;

receive a first response message from the terminal, wherein the first response message is comprised in an RRC connection reconfiguration response message sent from the terminal to a master node, the first response message indicating that the SRB is successfully established by using the configuration information for the SRB;

send the first response message to the secondary node; and after the SRB is established, send a downlink RRC message of the secondary node on a first path to the terminal; and send an uplink RRC message on a second path received from the terminal to the secondary node, wherein the uplink RRC message is a response message for the downlink RRC message, and wherein when the first path is that the downlink RRC message is sent to the terminal by the secondary node via the master node, the second path is that the uplink RRC message is sent to the secondary node via the master node; and when the first path is that the downlink RRC message is sent to the terminal by the secondary node directly, the second path is that the uplink RRC message is sent to the secondary node directly.

15. The apparatus according to claim 14, wherein:

the configuration information for the SRB is an RRC container; and the sending the configuration information for the SRB to the terminal comprises:

forwarding the RRC container to the terminal without parsing the RRC container.

16. The apparatus according to claim 14, wherein the one or more memories store the instructions for execution by the at least one processor to:

send security information used for the SRB of the secondary node to the secondary node, wherein the security information comprises at least one of a security key or information about a security algorithm.

17. The apparatus according to claim 14, wherein the one or more memories store the instructions for execution by the at least one processor to:

send a configuration failure notification to the secondary node when configuration of a RRC connection reconfiguration message sent from the secondary node to the terminal fails.

18. The apparatus according to claim 14, wherein the one or more memories store the instructions for execution by the at least one processor to:

send measurement configuration information to the secondary node, wherein the measurement configuration information is used to configure a condition for triggering the secondary node to send a measurement result to the master node; and receive a measurement result meeting the condition from the secondary node.

19. An apparatus, the apparatus comprising at least one processor and one or more memories coupled to the at least one processor, the one or more memories storing instructions for execution by the at least one processor to:

receive configuration information for a signaling radio bearer (SRB) of a secondary node from a master node, wherein the SRB is used to directly transmit a radio resource control (RRC) message between the secondary node and the apparatus;

configure the SRB by using the configuration information for the SRB;

send a first response message to the secondary node via the master node, wherein the first response message is comprised in an RRC connection reconfiguration response message sent to the master node, the first response message indicating that the SRB is successfully established by using the configuration information for the SRB; and after the SRB is successfully established, receive a downlink RRC message of the secondary node on a first path; and send an uplink RRC message to the secondary node on a second path, wherein the uplink RRC message is a response message for the downlink RRC message, and wherein:

when the first path is that the downlink RRC message is received by the apparatus from the secondary node via the master node, the second path is that the uplink RRC message is sent to the secondary node via the master node; and when the first path is that the downlink RRC message is received by the apparatus from the secondary node directly, the second path is that the uplink RRC message is sent to the secondary node directly.

20. The apparatus according to claim 19, wherein the configuration information for the SRB comprises: an SRB identifier, a radio link control (RLC) layer configuration of the SRB, a logical channel configuration, and an SRB security parameter.

* * * * *